Feb. 17, 1953

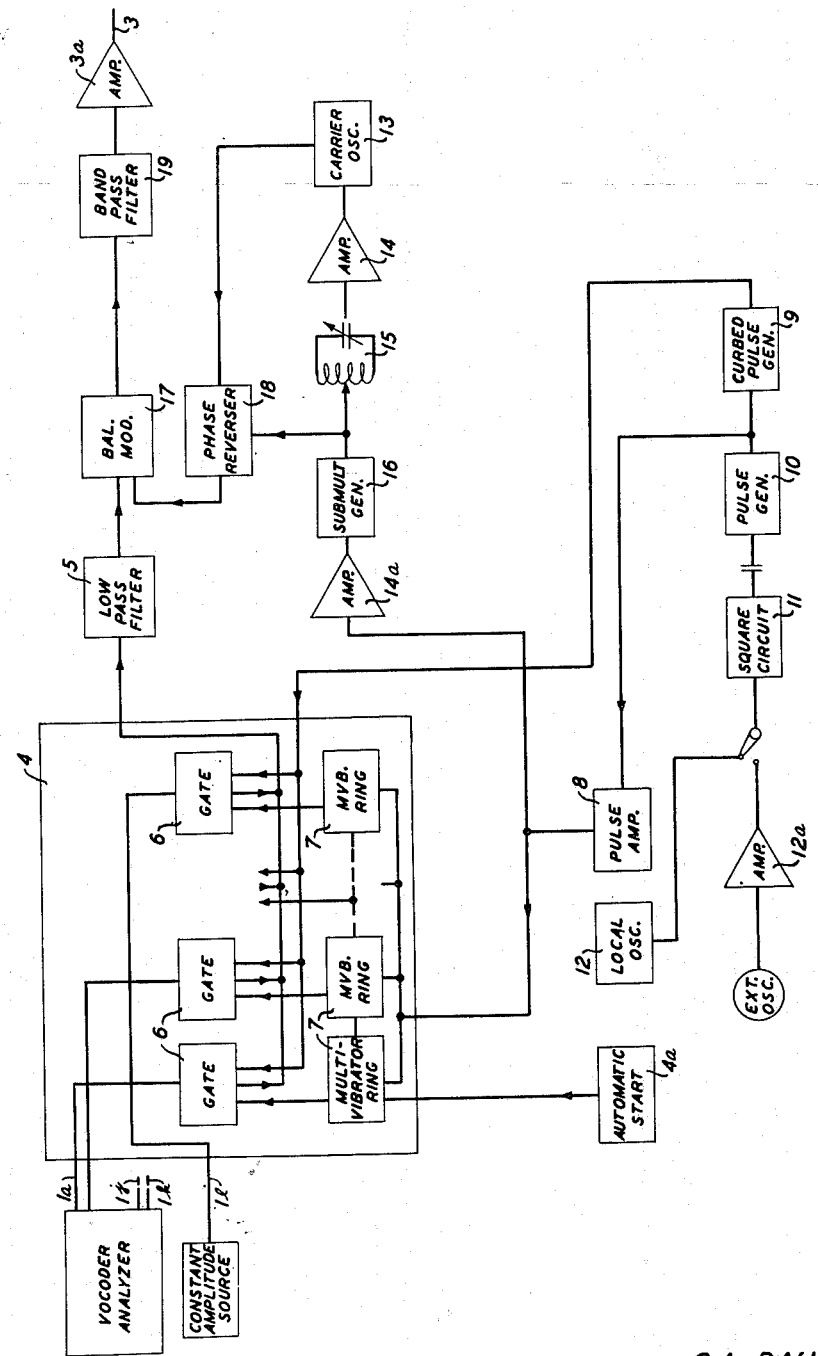

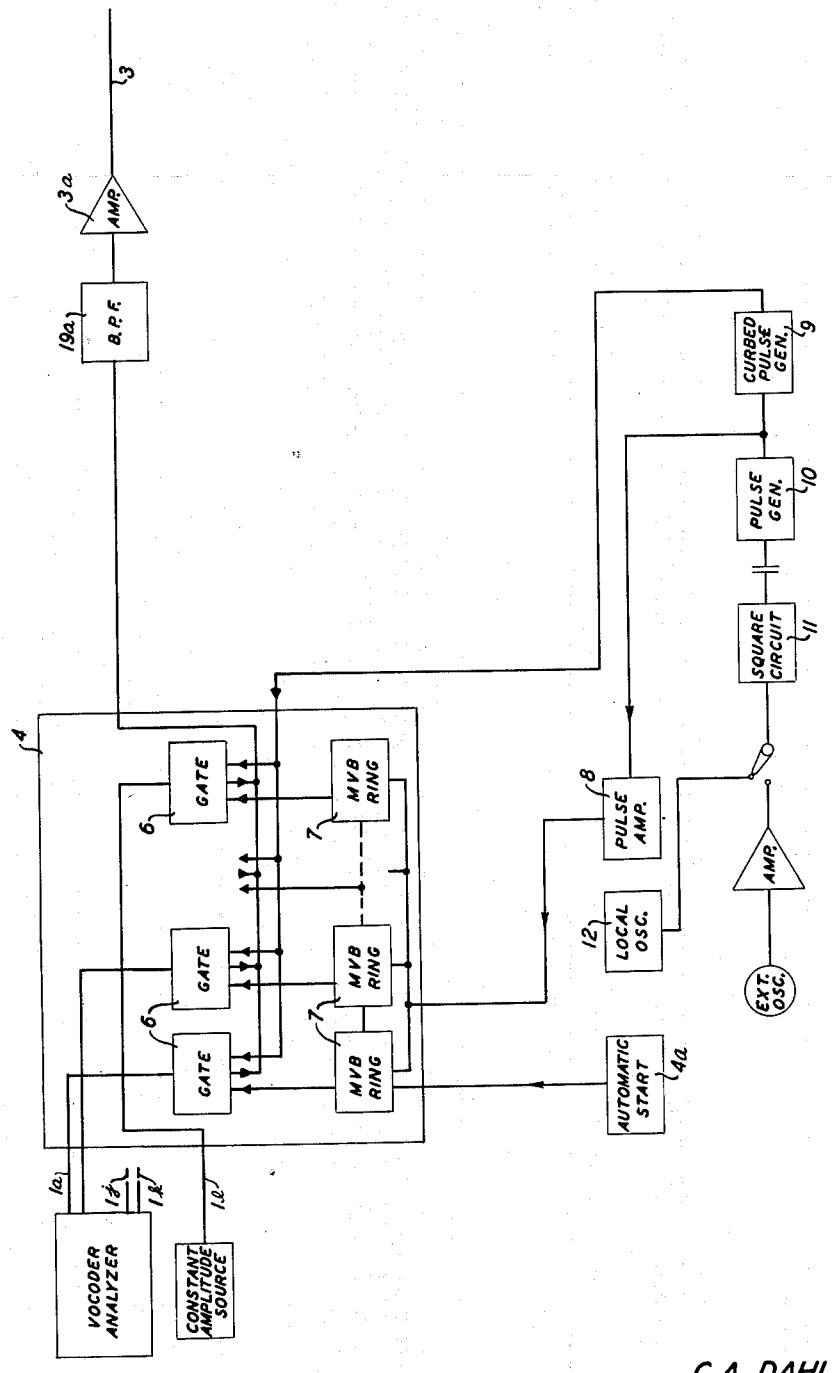
FIG. IA

C. A. DAHLBOM ET AL 2,629,017

SPEECH TRANSMISSION SYSTEM

Filed May 20, 1949

INVENTORS C.A. DAHLBOM
A. WEAVER
BY
R.C. Terry
ATTORNEY

INVENTORS C.A. DAHLBOM
A. WEAVER
BY
R.C. Levey
ATTORNEY

INVENTORS
C.A. DAHLBOM
A. WEAVER
BY
R.C. Terry
ATTORNEY

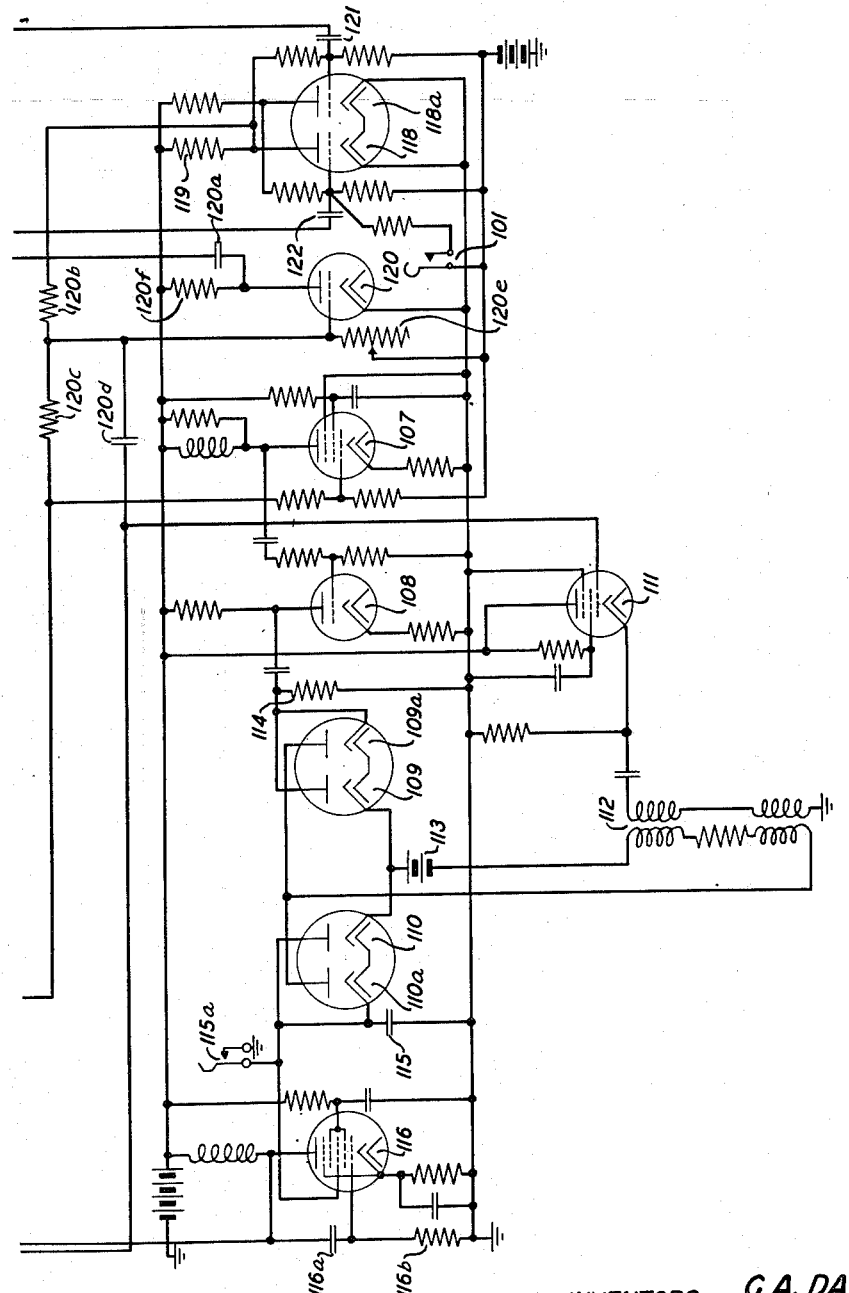

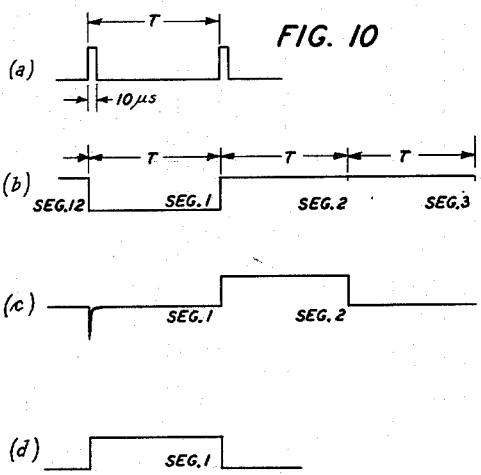
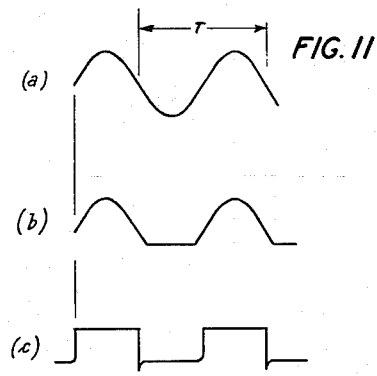
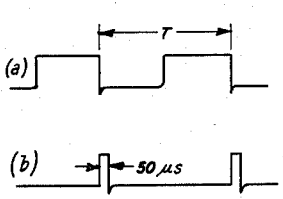
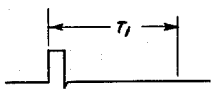
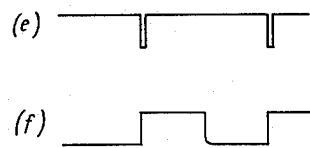
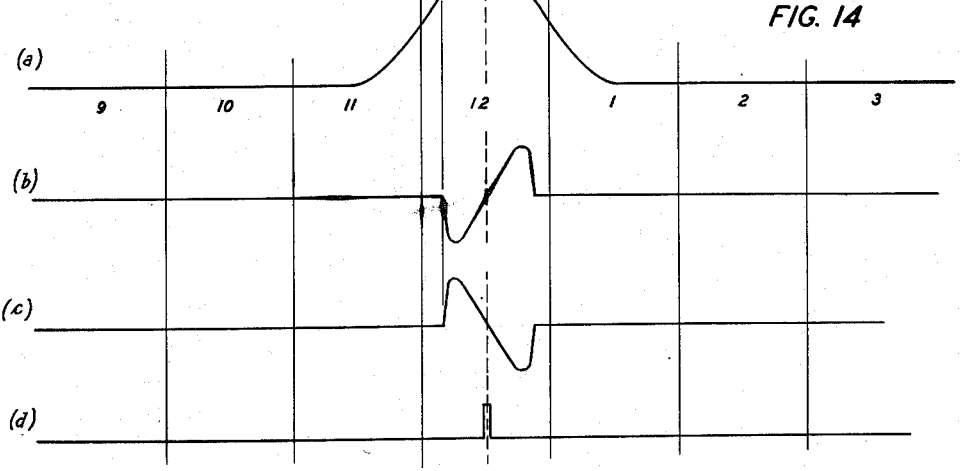

UNITED STATES PATENT OFFICE 2,629,017

SPEECH TRANSMISSION SYSTEM

Carl A. Dahlbom, Brooklyn, and Allan Weaver, Port Washington, N. Y., assignors to Bell Telephone Laboratories, Incorporated, New York, N. Y., a corporation of New York Application May 20, 1949, Serial No. 94,428

22 Claims. (Cl. 179—15)

The present invention relates to communication equipment and the novel transmission of intelligence. The system described can be applied to situations where a plurality of signal intelligences are to be transmitted over a narrow frequency range to some remote point, and where the plurality of intelligences supplied to the system may be discretely obtained at the remote point. The plural intelligences are caused to be supplied in sequence, and at a predetermined rate, to an ordinary transmission line or system. More particularly, the system is applicable to transmission and reception of signals obtained through the use of a "vocoder" system.

The term "vocoder" system will be understood to mean a system which analyzes a given speech or sound in terms of the intelligence contained therein; provides this intelligence to plural channels; and, at some distant point, synthesizes the given speech or sound from the intelligence received over the plural channels.

While the present description entails the use of a vocoder analyzer to supply the plural intelligence channels from given speech or sounds and of a vocoder synthesizer to reconstruct the given speech or sound from the discretely transmitted intelligences, it is to be understood that the system is not limited to such a vocoder system and may be applicable to telephonic and communication systems generally, of the time-division multiplex type, and to telemetering and synchronizing circuits of more general nature.

A typical vocoder arrangement employing a time-division system for transmitting the intelligence derived from the vocoder analyzer is shown in U. S. Patent 2,098,956 to Homer W. Dudley, granted November 16, 1937. This patent to Dudley describes a transmitting and receiving system for speech or audio signals. By virtue of the apparatus described, the speech to be transmitted is divided into ten amplitude pattern control channels, differentiated as to frequency. In addition, a frequency pattern control in an eleventh channel discriminates the desired speech or audio signals to provide a voltage proportional to the fundamental frequency or pitch of the sounds to be transmitted. The ten channels previously mentioned, as well as the channel of the frequency pattern control, are arranged to provide electrical currents representing intelligences which are functions of the eleven components of the speech as analyzed. The Dudley patent then describes a rotary distributor which samples each of the eleven components in sequence and transmits the sampled portion to some remote location. At the remote location, this complex electrical pattern is presented to a rotary distributor synchronized with the rotary distributor of the transmitter. The rotary distributor at the receiver will, in turn, provide a group of eleven electrical currents at the transmitting position. A vocoder synthesizer then operates to piece together the ten components differentiated as to frequency and the frequency pattern control component, obtaining a synthesis of the speech or audio signal substantially as it was supplied to the vocoder analyzer.

The distributors for the transmission and reception of the various channels indicated in the Dudley patent operates by virtue of rotary mechanical equipment. In the present specification, there will be described a vocoder system wherein the various signals derived from the vocoder are sampled by an electronic distributor. Similarly, the receiver will be shown to employ another electronic distributor to reproduce the components of the desired signals to be reassembled by the vocoder synthesizer. Two electronic means will be described whereby synchronization of the electronic transmitter and receiver distributors may be achieved by an appropriate choice of transmitter circuits. These two means employ either a carrier amplitude modulation and phase reversal or a pulse modulation system.

An object of the present invention is to provide an electronic commutation or distributor arrangement which may be made operative over a wide range of distributing speeds, and with means to synchronize the distributors.

Another object of the invention is to provide electronic transmission of vocoder signals by time-division.

A further object of the invention is to provide a novel synchronizing system for the transmitting and receiving electronic distributors without the use of stop-start or pilot channel signals.

Still a further object of the invention is the transmission of speech and sounds over a band of frequencies, small in comparison to the speech and sounds sought to be transmitted. The objects of the invention may be realized by the means or process described in detail in the following specification:

Figure 1 represents a simplified block diagram of a vocoder transmitter system in accordance with the invention;

Figure 1-a represents a simplified block diagram of a modified vocoder transmitter system;

Figure 2 indicates a simplified block diagram of the vocoder receiver system in accordance with the invention;

Figure 3:
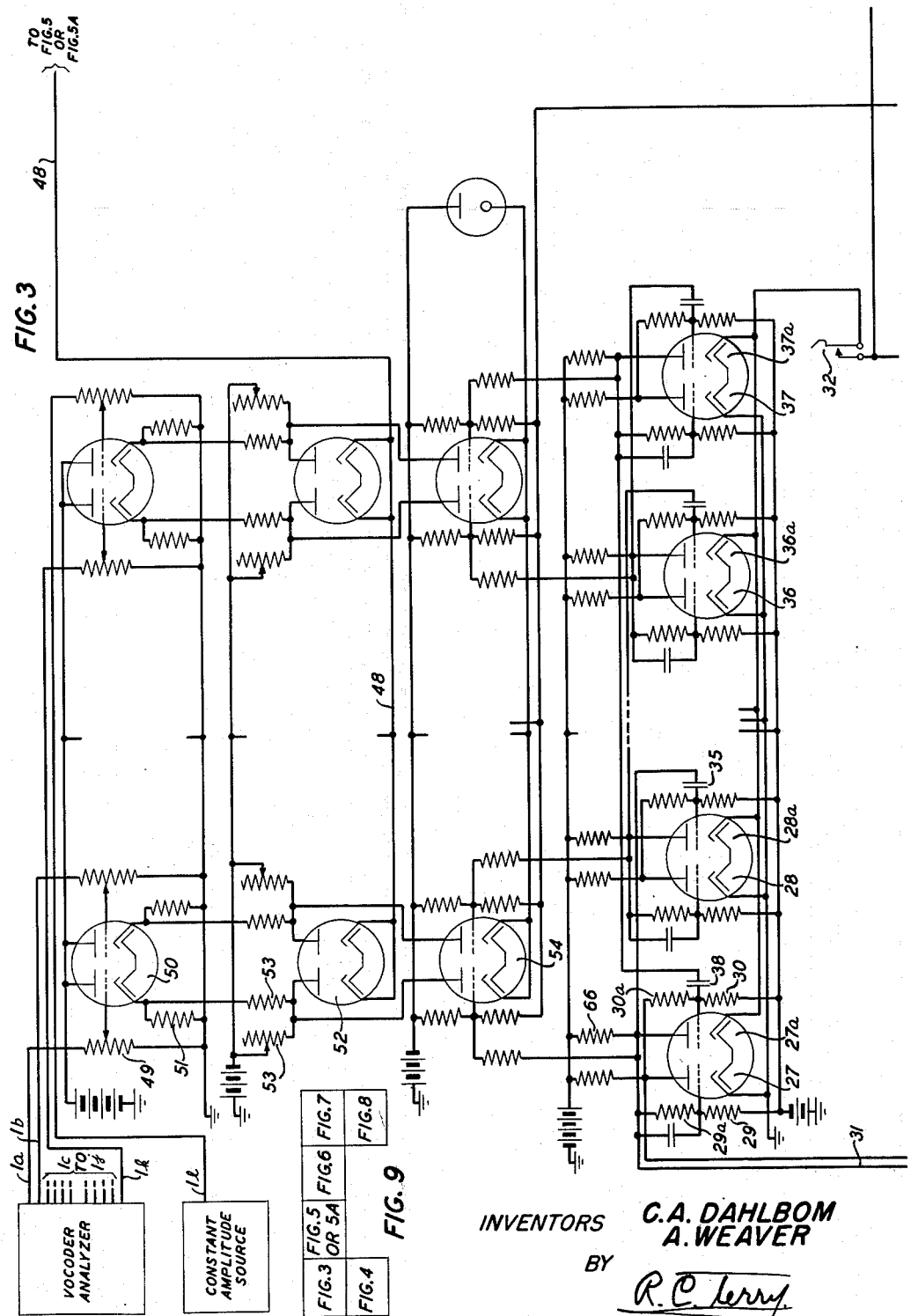
Figure 3 shows a schematic diagram of an electronic transmitter distributing system in accordance with the invention.
Figure 4:
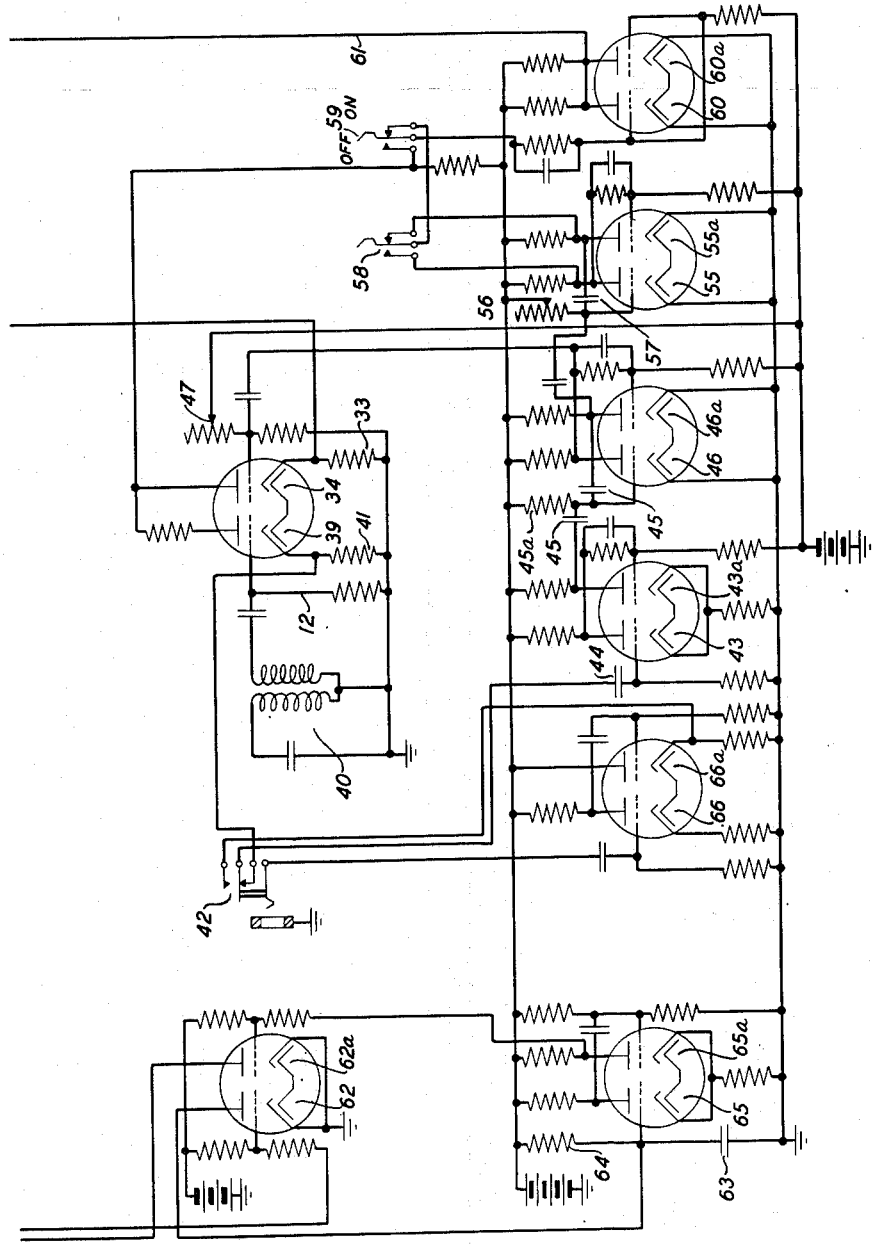
Figure 4 shows a schematic diagram of the oscillator and pulse control circuits for the electronic transmitting distributor shown in Fig. 3 and is to be read in conjunction therewith.
Figure 5:
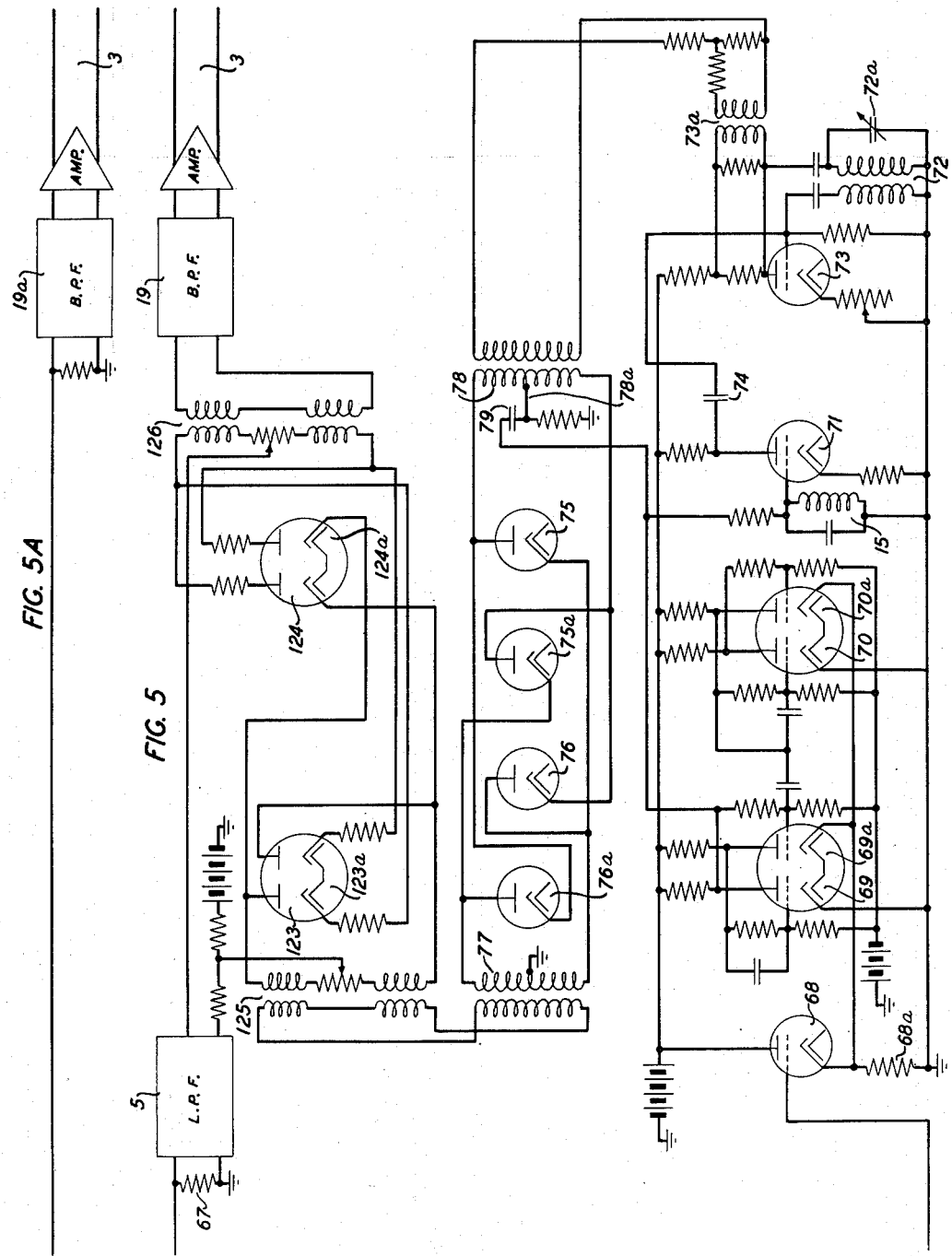
Figure 5 shows a schematic diagram of a carrier oscillator and modulator for connection to the electronic transmitting distributor and control circuits shown in Figs. 3 and 4 and are to be read in conjunction therewith.
Figure 6:
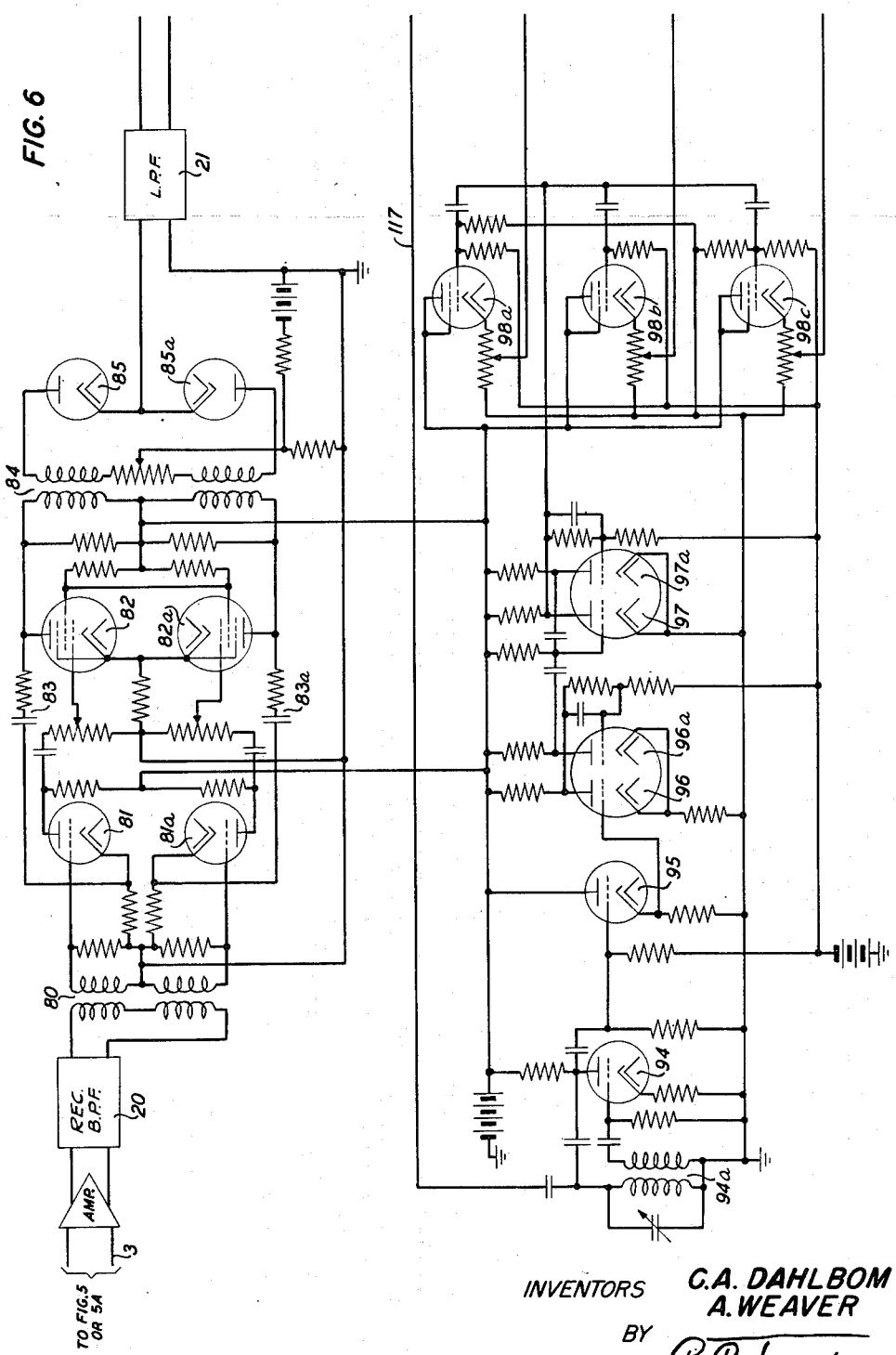
Figure 7:
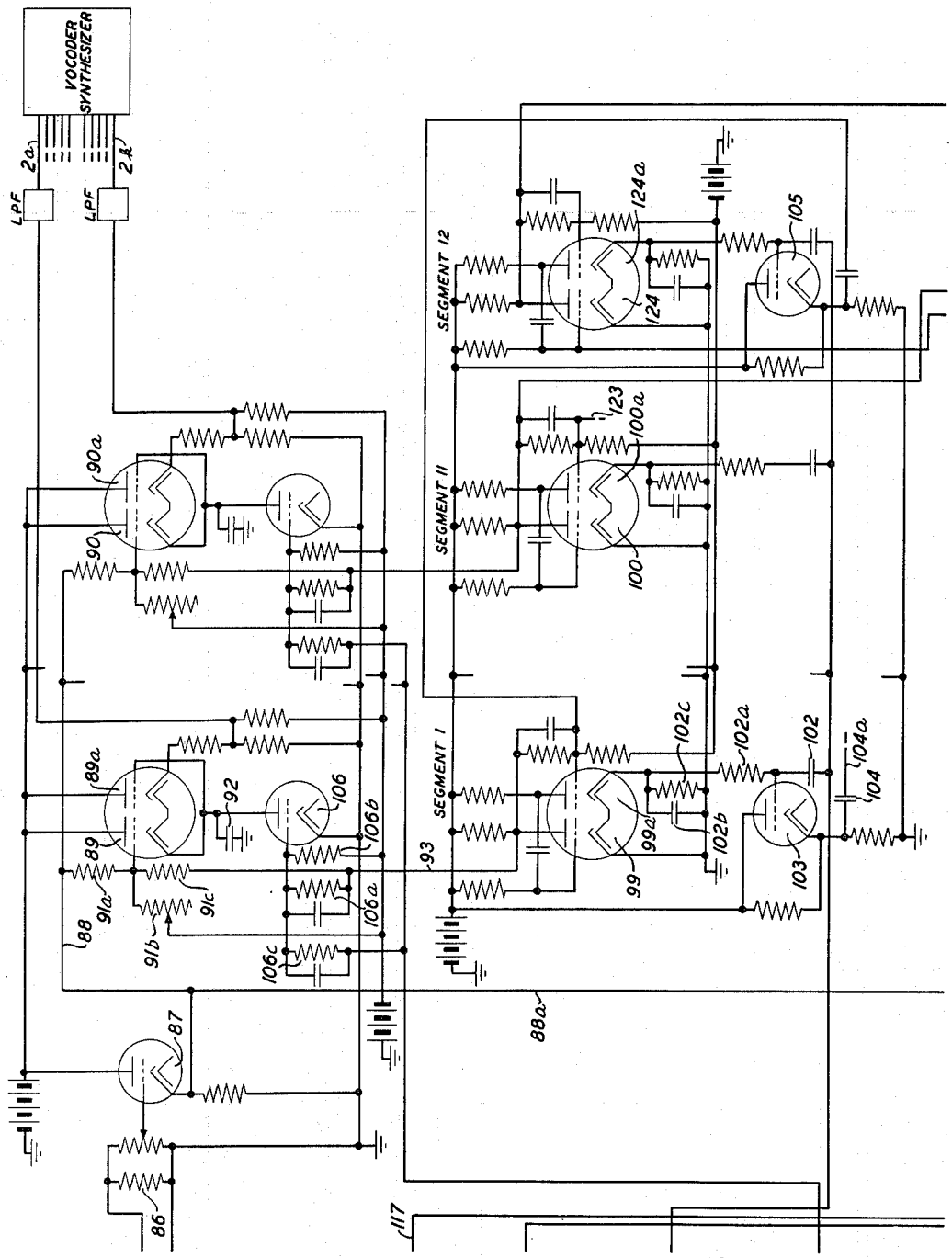

Figure 5-a shows a modification of the transmitter shown in Fig. 5 in accordance with the invention;

Figure 6 shows a schematic diagram of a demodulator and the local control oscillator for the vocoder receiving system;

Figure 7 shows an electronic receiving distributor to be used in conjunction with the demodulator and control oscillator shown in Fig. 6 and is to be read in conjunction with Fig. 6;

Figure 8 shows a schematic diagram of a synchronizing arrangement to be used in conjunction with the electronic receiving distributor Fig. 7 and the demodulator and control oscillator of Fig. 6 and is to be read in conjunction therewith;

Figure 9 shows the interrelation of Figs. 3, 4, 5, 5-a, 6, 7 and 8;

Figures 10 through 14 are timing and waveform diagrams to be used in the explanation of Figs. 1 through 8.

For a general understanding of the system of the present invention, reference may first be made to Fig. 1.

There is shown in this figure a block marked "vocoder analyzer" at the transmitting station. In Fig. 2 will be found a block marked "vocoder synthesizer." The analyzer and the synthesizer may, for example, be of the general type disclosed in the previously mentioned Dudley patent. The vocoder analyzer of the present application is adapted to receive a voice-frequency signal such as human speech, and to generate, in ten different leads designated as 1-a through 1-j inclusive, slowly varying direct-current voltages representative of the instantaneous value of the energy in ten chosen frequency bands of the speech signal supplied to the vocoder analyzer. In addition, the vocoder analyzer also generates in lead 1-k a direct-current voltage representative of the fundamental component of frequency or pitch of the speech signal. The vocoder synthesizer shown in Fig. 2 is provided with ten input leads 2-a to 2-j, to which it is desired to apply a direct-current voltage corresponding to those appearing in the leads 1-a to 1-j. There is also provided an eleventh input lead 2-k to which it is desired to apply a voltage representative of the fundamental component or pitch of the sound frequency corresponding to the voltage appearing in lead 1-k. With such voltages applied to its input leads, the vocoder synthesizer is adapted to produce a sound similar to that entering the vocoder analyzer.

In addition to the eleven vocoder channels, it will later be shown desirable to provide a twelfth channel through leads 1-L and 2-L originating in the block marked "constant amplitude source." The function of this constant amplitude source is to provide a synchronizing signal when the vocoder input is silent and the eleven channels associated therewith are unexcited.

The general plan is to connect periodically each channel to the line for a short period of time, and to repeat this process at a rate which is faster than the rate at which currents are varying in each of the channels.

Each of the channel leads 1-a to 1-k and the synchronizing channel lead 1-L are supplied to an electronic transmitting distributor 4. In the electronic transmitting distributor, each of the channel leads are connected through an electronic gate circuit in series with the lead to a low pass filter 5. The detailed operation of the gate circuits of the electronic transmitting distributor will be later described. In function, the electronic transmitting distributor samples each of the twelve channels supplied to it, for a period of time closely predetermined and in repetitive succession. Thus, the somewhat similar operation performed by the rotary mechanical distributor of the Dudley patent, previously mentioned, is herein performed electronically with the aid of a group of gate circuits 6. The various samples of the various channels as individually received from the distributor will be called "signal elements."

Each channel is delivered to one of the distributor gates and the appropriate gate is opened in turn by one of a group of multivibrators 7, operating in a ring arrangement. The operation of the multivibrator ring 7 is controlled by an impulse to be called the "stepping" pulse. This stepping pulse is a pulse of voltages supplied from the "pulse amplifier" 8, having a repetition rate dependent upon the rate at which the distributor is to step in opening each successive gate circuit.

It will sometimes be found desirable to open the gate of the transmitting distributor for a period of time less than the total time available for the sampling of each individual channel as gauged by the interval between stepping pulses. Such reduction in the time which the gate will allow for sampling over the time which might be allowed by strict fractional division will be called the "curbing." The net effect is a reduction of the time-width of a signal element. "Curbing" is obtained by a control voltage or curbing pulse, supplied from the curb pulse generator 9 to the various gate circuits.

Both the pulse amplifier 8 and the curb pulse generator 9 receive the same pulsed signal input. This pulsed signal is obtained from pulse generator 10. In turn, the pulse generator receives a square wave of input from the squaring circuit 11. The squaring circuit receives a sine wave input either from a local oscillator, the oscillator 12, or alternatively from a separate external oscillator to be supplied through an amplifier 12-a.

The multivibrator ring of the electronic transmitting distributor is not self-starting; as a result, the circuit found in the block marked "automatic start" supplies the necessary impulses for starting the multivibrator ring.

The frequency of the local oscillator will be dependent upon the amount of intelligence to be transmitted. In vocoder systems of the type described, the alternating component of the slowly varying direct current representing the intelligence may vary from 0 to approximately 25 cycles. If the distributor performs the function of connecting each of the channels to the transmission line at a rate somewhere between 35 and 40 times per second, the intelligence contained in the various channels will be adequately scanned. If the rate of connection is multiplied by the number of channels required, the estimated band-width can be computed. A satisfactory local oscillator frequency has been found to be 440 cycles per second.

It will be necessary to synchronize the distributing systems of the transmitter and receiver. Two means will be shown at the transmitter for provision of synchronization. In general, one method will employ a carrier amplitude modulation system and the second method will indicate a shock-excited pulse modulation system. The receiver will, in any event, be the same for either of the two indicated synchronization systems.

In the carrier amplitiude modulation system of synchronization, a carrier oscillator 13 is provided. It is desirable to stabilize this carrier oscillator from the pulses derived at the output of the pulse amplifier 8; the actual control of the oscillator frequency is made through amplifier 14, a tuned-circuit 15, the sub-multiple generator 16 and its associated amplifier.

In the carrier amplitude modulation synchronization system, it is the output of carrier oscillator 13 that is modulated by the output of the electronic distributor through the low-pass filter 5. The modulation takes place in balanced modulator 17. The synchronization proper is achieved by a phase reversal of the carrier with every signal element gated by the distributor; phase reversal is achieved in the phase reverser 18. The phase reversal circuit is triggered by a portion of the output of the sub-multiple generator 16. In turn, the output of the balanced modulator is supplied to the transmission line 3 through the band-pass filter 19 and line amplifier 3-a. Band-pass filter 19 will tend to eliminate spurious harmonics and side-bands outside the range of frequencies to be transmitted.

An objective of the invention has been stated as being the transmission of speech or sound over a minimum channel width. For this reason, it is desirable to have as low a carrier frequency as possible. When the stepping pulse has a rate of 440 cycles as governed by the local oscillator, the minimum frequency of the carrier for optimum operation is at about 660 cycles. Such a frequency bears a harmonic relation to a sub-harmonic of the local oscillator frequency, allowing a synchronization of the two previously indicated as desirable. The 660-cycle carrier will have sidebands ±220 cycles to form the 440-cycle modulation channel.

A second type of synchronization is the pulse type modulation system shown in Fig. 1-a. The pulse type modulation system employs a highly curbed signal; i. e., a very narrow pulse is produced within each signal element. As the signal elements are produced by the transmitting distributor, extremely narrow pulses will produce approximately equal harmonics over a wide range of harmonics, a phenomenon which is well known. The pulse may be made narrow enough so that all harmonics of a represented signal are substantially equal over a range of frequencies which will be included in a band-pass filter attached to the output of the transmitting distributor. It may be shown that when these equal amplitude harmonics are impressed upon a filter with the proper transfer admittance, such as band-pass filter 19-a, a carrier envelope will be formed meeting the requirements for distortionless transmission. The theory upon which the foregoing is predicated is discussed in detail in a treatise entitled "Certain topics in telegraph transmission theory" by H. Nyquist, published in the Transactions of the American Institute of Electrical Engineers; April, 1928; vol. 47, pages 617 to 644. The carrier currents generated by the band of equal amplitude harmonics will produce impulses which will be interpreted by the receiver and will provide the same type of synchronization as the carrier amplitude modulation system.

With either system of synchronization, it will be seen that successful operation is dependent upon the presence of a signal in at least one of the transmitted channels. To provide synchronization when no signal is supplied to the vocoder, the twelfth channel from the constant amplitude source, previously alluded to, is necessary.

The transmitting distributor output and the synchronizing voltages are, in any event, supplied to the transmission line 3, through a band-pass filter 19 or 19-a as the case may be, and a line amplifier 3-a.

Referring now to Fig. 2, the signals obtained at the receiving location over the transmission line 3 are supplied first to an amplifier 3-b and a band-pass filter 20, eliminating unwanted frequencies outside the range of carrier frequencies plus side-bands, and thence to the demodulator 20-a. The output of the demodulator is, in turn, supplied to a low-pass filter 21, eliminating all frequencies but the modulation components and amplifier 21-a. The signal derived from the output of amplifier 21-a is supplied to the synchronized electronic receiving distributor 22, specifically to the gate circuits thereof.

The receiving distributor operates in a manner inverse to that of the transmitting distributor. A gate signal and a ring-stepping signal are supplied to "pulse amplifier" 25-c and 25-b respectively from the "local oscillator" 23; through a "squaring circuit" 24; and "pulse generator" 25, all being similar to those described in regard to the transmitter. These signals perforce control the operation of the receiving distributor, commutating the receiving signals to twelve discrete voltages, the necessary eleven of which may be supplied to the vocoder synthesizer.

The oscillator 23 may be stabilized at the same frequency as the transmitter and synchronized with oscillator 12 of the transmitter by virtue of the reactance tube 26 and its associated circuits 26-a and 26-b, in turn controlled by the output of amplifier 21-a and the pulse amplifier 25-a as follows: When the output of the local oscillator, as represented by the output of pulse amplifier 25-a, coincides with the center of the pulses received from the transmitter through the amplifier 21-a, the reactance tube will provide no correction to the oscillator. When the received pulses lag or lead the local oscillator, the differentiator 26-a will provide a pulse through its amplifier 26-c to the rectifier gate and this gate will now be open by virtue of the frequency relation of the local oscillator and received signal output. A corrective voltage will thereupon be supplied to reactance tube 26, which will control the local oscillator circuits to return the local oscillator to synchronization.

While such a synchronization system will lock the frequency of the local oscillator 23 with that of the transmitting oscillator 12, the electronic transmitting and receiving distributors must be operated together both in frequency and in phase. Thus, when the transmitting distributor allows its gate circuit to sample a given channel, the receiving distributor must simultaneously be supplying the received signal to the appropriate similar channel of the vocoder synthesizer; though the electronic distributors rotate at the same speed, a shift in phase between the transmitting and receiving distributor will cause the system to become inoperative. To provide the necessary phase synchronization, the start gate circuit 22–a and a start tube 22–b cause the transmitting and receiving distributors to lock in phase upon the transmission of the synchronizing channel; the receiving distributor will stop and wait for the transmitting distributor to arrive at the channel corresponding to the synchronizing signal channel. Correction may thus be made as to phase differences for each distributor cycle.

The circuit may now be considered in more detail; particularly, reference may now be made to Figs. 3, 4, 5, 6, 7 and 8 associated together in the manner indicated in Fig. 9 as a complete system of the type described in connection with Figs. 1 and 2; and to Figs. 3, 4, 5–a, 6, 7 and 8, also associated together in the manner indicated in Fig. 9 as a complete system of the type described in connection with Figs. 1–a and 2.

*Transmitting distributor—multivibrator ring circuit*

As previously indicated, the function of the transmitting distributor is to connect successively each channel to a common line for a short interval of time. In the circuit developed this function is accomplished electronically as shown in Fig. 3. The distributor is composed of two circuit parts; a group of gate circuits corresponding to 6 in Fig. 1 are individually coupled to each of the vocoder and synchronizing channels and in multiple to the line, and a group of ring circuits corresponding to 7 in Fig. 1, each developing a gate control voltage from the pulse stepping voltage later to be described, which open the appropriate gate circuit in a predetermined sequence.

In Fig. 3, thermionic discharge tubes 27, 27–a, 28, 28–a, 36, 36–a, 37 and 37–a comprise part of a ring circuit for developing the gate control voltage. For the sake of simplicity, intervening ring tubes are now shown; each channel to be sampled must have a pair of ring control tubes such as 27 and 27–a.

Assuming static conditions prevail, the operation of tubes 27 and 27–a may first be studied. Tubes 27 and 27–a will arbitrarily be assumed as associated with segment number 1 of the distributor cycle. Thermionic discharge tubes 27 and 27–a are connected in a multivibrator circuit of the flip-flop type, having two conditions of stability. Assuming that one condition of stability resulting in a "closed gate" condition is the "normal" condition, the left-hand thermionic discharge tube 27 will be normally conducting and the right-hand thermionic discharge tube 27–a normally non-conducting. This condition is achieved by the proper selection of resistors 29 and 29–a and 30 and 30–a and the other circuit parameters. Each of the corresponding left-hand tubes, as 28, 36 and 37, are normally conducting, while the right-hand tubes, as 28–a, 36–a and 37–a, are normally non-conducting. When the system is to be energized, a starting pulse will be assumed received over lines 31 from the automatic start circuit. This signal takes the form of an effective low resistance between the anode of tube 27–a and ground, reducing the anode voltage at the anode of tube 27–a. The net effect is to cause the right-hand tube 27–a to be conducting, in turn causing the left-hand tube 27 to become non-conducting, this being the second condition of stability. The operation of the automatic start circuit will be later described.

The stepping pulse amplifier shown in Fig. 4, corresponding to 8 in Fig. 1, provides a ground return for the cathode of 27–a through pulse operating lever 32, and through cathode resistance 33, to ground. When the pulse amplifying triode 34 becomes conducting in a manner later to be described, the cathode of 27–a will receive a positive pulse with respect to its grid. Tube 27–a thereupon assumes a sufficiently negative grid potential to cause it to become non-conducting and restoring tube 27 to conduction, this being the "normal" condition of stability. The voltage developed across resistor 33 will be found to a square wave as shown in Fig. 10(a). As a result of the non-conduction, conduction and non-conduction cyclically indicated for tube 27–a, there will be developed a voltage at the anode of tube 27–a corresponding to Fig. 10(b). It will be found that this voltage established the parameters of segment 1. The anode of triode 27–a is coupled to the grid of tube 28–a through a capacitance 35. The negative to positive transition of the signal at the anode of 27–a as shown in Fig. 10(b) will apply a positive signal to the grid of tube 28–a as shown in Fig. 10(c), causing 28–a to become conducting. This negative to positive transition occurs as tube 27–a is returning to its normal non-conducting condition; the positive to negative transition of 27–a will not affect tube 28–a as 28–a would be at cut-off at this time in any event. Under static conditions, tube 28 would be found normally conducting while tube 28–a would be normally non-conducting.

Conduction of tube 28–a caused by the pulse supplied through capacitance 35 from tube 27–a will, in turn, cause 28 to become non-conducting by virtue of the grid of 28 becoming increasingly negative through the decrease of the anode voltage of 28–a as it becomes conducting. The cathode of 28–a has a return path in multiple with 27–a through the cathode-resistance 33 of the stepping pulse amplifier 34. The next signal from the pulse amplifier will operate on the cathode of 28–a and again cause that tube to become non-conducting, restoring the triode 28 to the conducting condition. Thus, the decay of the static condition of a given right-hand ring tube as 27–a will cause the next right-hand ring tube 28–a to become conducting. When a period of time has elapsed, measured by the pulse-stepping circuit, tube 28–a will in turn decay to non-conduction and the following right-hand ring will be energized to its second condition of stability. This process will be repeated in each tube in the ring circuit; the last tube 37–a has its anode connected through capacitance 38 to the grid of triode 27–a, reinitiating the multivibrator ring cycle without the necessity of repetition of the automatic start voltage.

The net result of the operation of the multivibrator ring as it passes through its cycle will be to provide an output pulse of voltage obtainable sequentially and repetitively at the anode of the right-hand ring tubes such as 27–a, 28–a, 36–a and 37–a, and having a waveform as shown in Fig. 10(b). This output pulse of voltage will have a time-width equivalent to the total time which may be allowed for the sampling of any channel of the vocoder through the later described gate circuits, and is measured by the time interval elapsing between stepping pulses. Assuming that the pulse or voltage obtained at each of the anodes of the right-hand tubes such as 27–a, 28–a, 36–a and 37–a can be represented as a period of time, T; T represents the maximum period in which any channel could be connected to the line in any cycle of the ring.

The operation of the pulse-stepping circuits will now be described. Referring to Fig. 4, a triode 39 has associated with its grid cathode circuit a tuned oscillatory circuit 40. Triode 39 provides an oscillation whose frequency will depend, inter alia, on the values of inductance and capacitance of tuned circuit 40. This local oscillator corresponds to 12 in Fig. 1. Triode 39 will generate an oscillation, a sine wave of voltage having a frequency of $1/T$, where T is the time of one cycle and the desired time-width between each multivibrator ring output pulse previously described. The waveform of the output of the oscillator triode 39 is shown in Fig. 11–a. The output of triode oscillator 39 is connected through cathode coupling resistance 41 and the normally closed contact and armature of jack 42 to the grid of triode 43 through the coupling capacitance 44. The wave shape supplied from the cathode coupling resistor 41 of the oscillator circuit is in the form of an approximate half cycle as shown in Fig. 11(b).

Tubes 43 and 43–a comprise a wave-squaring circuit for the half-sine wave obtained from the oscillator, and corresponds to the squaring circuit 11 of Fig. 1. Assuming that triode 43 is ordinarily conducting, the voltage having a half-cycle wave shape as shown in Fig. 11(b) is applied to the grid of tube 43; when the loop of this half-cycle wave reaches a predetermined value, triode 43 will be driven below cut-off and the loop of the half-cycle curve will be eliminated. Tube 43 operates primarily as an amplifier. The triodes 43 and 43–a have a common cathode circuit, comprising an unbypassed resistor. This unbypassed resistor will provide a positive feedback, thereby steepening the sides of the resulting signal. Thus, an essentially square wave, as shown at Fig. 11(c), will be developed at the anode of tube 43–a.

The anode of tube 43–a is coupled through capacitance 45 to the grid of tube 46. The succeeding stage is a pulse generator comprising tubes 46 and 46–a coupled as a single vibrator of the single trip type, and will be triggered by the square-topped signals received from triode 43–a. The pulse generator corresponds to 10 in Fig. 1. Tube 46 in its normal condition has a large positive grid bias supplied through resistor 45–a from the anode supply voltage; tube 46 is therefore normally conducting. The resulting low voltages applied from the anode of 46 to the grid of 46–a serves to hold the right-hand tube normally to cut-off. Upon the decay of the square-topped wave shown in Fig. 11(c), a transient voltage makes the grid of tube 46 of such a less positive polarity as to become non-conducting, and therefore renders the right-hand tube conducting. Conduction of the right-hand tube causes a pulse to be transmitted from the anode of the right-hand tube, through capacitance 45–b to the grid of the left-hand tube, which again becomes conducting, and the single vibrator is restored to its normal condition. The growth side of the waveform shown in Fig. 11(c), caused by an increasing positive charge in the anode circuit of tube 43–a, will not cause tube 46 to become non-conducting and as a result, only one pulse results for each square-waved signal. A pulse as shown in Fig. 11(d) is developed at the anode of 46, as shown in Fig. 11(c) at the anode of 46–a.

The pulse developed at tube 46 is of extremely short duration and dependent upon the circuit constants associated with 46 and 46–a. It has been found desirable to limit the width of these pulses to approximately ten microseconds duration for the carrier and stepping pulse frequencies previously indicated; the spacing between the pulses are, of course, at intervals equal to one cycle, T, of oscillator 12.

Pulses obtained from the anode of tube 46 are supplied in turn to a cathode-follower amplifier called the stepping pulse amplifier 8, in Fig. 1. This stepping pulse amplifier, comprising triode 34, will normally be non-conducting by virtue of a negative voltage supplied to the grid of tube 34 through rheostat 47. Initiation of the pulse from the anode circuit of triode 46 will provide a more positive grid voltage to triode 34, and triode 34 will conduct. Thereupon, a voltage will be developed across cathode resistance 33 having a time-width approximately equal to the pulse presented in the anode circuit of tube 46. It is this pulse developed across the cathode resistance 33 which has been indicated as connected in multiple to the cathode circuits of the multivibrator ring tubes shown in Fig. 3 and previously discussed.

*Transmitting distributor—gate circuits*

The operation of the multivibrator ring and its associated stepping pulse circuits has been described; a voltage that will be used for gating control and having a time duration equal to T, will be developed at the anode of the right-hand triodes of the multivibrator ring, as for example, 27–a, 28–a, 36–a and 37–a, successively and in a repetitive cycle.

The gate circuits comprise three stages: a cathode coupled amplifier, a diode and a control tube; one of each of these is required for every channel to be sampled by the distributor. Referring again to Fig. 3, assuming that one channel of the vocoder analyzer connects to lead 1–a, thence to the potentiometer 49 and finally to the grid of triode 50, the signal output of triode 50 is supplied across the unbypassed cathode resistor 51 to the anode of diode 52 through resistance 53. One purpose of the cathode coupled amplifier 50 is to decouple the vocoder analyzer from the remainder of the gate circuits and the line. When the gate circuit is open, the intelligence originally presented from the channel of the vocoder over lead 1–a and through amplifier triode 50, will pass through the diode 52 to the cathode of the diode and eventually to lead 48. When the gate circuit is to be closed, the diode 52 will no longer conduct and will disconnect that particular channel of the vocoder from the line 48. The anode current of triode 54, when conducting, causes a sufficient voltage drop across rheostat 53 to depress the anode voltage of diode 52 below the point at which diode 52 will conduct. The net effect of the gating diode 52 and the control tube 54 is to connect one of the channels of the vocoder to the line 48 whenever the control tube 54 is non-conducting.

The operating condition of control tube 54 depends upon the voltage applied to its control grid. This control grid voltage is supplied from a resistive network inserted between the control tube 54 and the anode of the ring tube 27-a.

As has previously been shown, the anode of 27-a will draw current for a measured period of time, T, once per cycle of the multivibrator ring. It can be seen that the conducting condition of tube 27-a will make the control grid of tube 54 more negative and will, therefore, render tube 54 non-conducting during those periods that tube 27-a is conducting. Therefore, when the operation of the multivibrator ring has come to that portion of its cycle at which tube 27-a is conducting for a measured period of time, T, the control triode 54 will become non-conducting and the signal from the appropriate vocoder channel will pass through diode 52 and be supplied to lead 48.

It may similarly be shown that the other cathode coupled amplifiers, gate diodes and control triodes connected to each of the various other vocoder channels and to the synchronizing channel will connect each of the vocoder channels to the lead 48 sequentially and repetitively in accordance with the operation of the multivibrator ring.

The condition that has just been described indicates a connection of each of the vocoder channels to lead 48 once per distributor cycle and for a period of time, T, equivalent to one step of the multivibrator ring. This is the condition representing no "curbing"; the signals from the vocoder channel are presented to the lead 48 for one full signal element. It will be found desirable to reduce the period of time during which the vocoder channels are connected to the lead 48 for some period less than the total time, T, of one signal element. The percentage of reduction from the total time, T, to which the signals are reduced is called the per cent curbing time.

Curbing is achieved by the use of a curbed pulse generator. Referring again to Fig. 4, a portion of the signal output of the pulse generator amplifier 46-a is supplied to the grid of triode 55. Triodes 55 and 55-a comprise a single vibrator of the single trip type in which the left-hand triode 55 is normally conducting and the right-hand triode 55-a is normally non-conducting. The positive to negative transition of the voltage at the anode of triode 46-a shown at Fig. 11(e) will provide a pulse causing the left-hand triode 55 to become momentarily non-conducting. The non-conducting condition in triode 55 will cause triode 55-a to become momentarily conducting. The net effect at the anodes of the single vibrator tubes 55 and 55-a is to generate a square-topped wave. This square-topped wave will have a time interval dependent upon the time constant of the resistance potentiometer 56 and capacitance 57. The repetition rate at which these square-topped signals are generated is dependent upon the frequency of the positive to negative transitions of the anode of tube 46-a, in turn dependent upon the frequency of the oscillator 12.

The anodes of either the triode 55 or 55-a are selectively connected through a key 58 to an "on-off" key 59. If the on-off key is in its right-hand position, the output of the anode of either the single vibrator 55 or 55-a will be connected to the grids of amplifier triodes 60 and 60-a. The relative phase of the curbed signals will depend upon the position of key 58; the phase of the pulse obtained depends upon whether the anode of tube 55 or 55-a is connected to amplifier tubes 60 and 60-a.

The curbed pulses, having a wave shape as shown in Fig. 11(f), are supplied from the anode of amplifier tubes 60 and 60-a over lead 61 in multiple to the control grids of each of the control tubes, e. g., 54. It has previously been shown that the gate associated with a particular control tube will only open when the control tube is non-conducting. The output of the curbed pulse amplifiers 60 and 60-a will be combined with the pulse received from the associated right-hand multivibrator ring tube, e. g., 27-a, at the grid of control tube 54. The curb pulse thus combines with the anode signal of tube 27-a to control the conducting period of tube 54. While the stepping pulse multivibrator ring would allow tube 54 to open the gate for a full period of the signal element, T, the curbing pulse is supplied from amplifiers 60 and 60-a for such a period of time that control tube 54 is rendered non-conducting for only a percentage of the time available over one full signal element T. This percentage is equivalent to the percentage curbing.

Ultimately, then, the percentage curbing, which is the time in which a gate will be open in comparison with the time of one full signal element, will depend upon the interval of the square-topped wave generated by the curbed pulse generator and therefore upon the time constant of the R-C network formed by elements 56 and 57.

*Transmitting distributor—automatic start circuit*

To provide for starting of the multivibrator ring upon initial operation of the system, or whenever a power failure has occurred, it has been indicated that provision is made to supply a starting pulse to one of the multivibrator ring triodes. This starting pulse is generated by the circuit shown in part in Fig. 4.

The grid of triode 62 is normally non-conducting and connected to the anode of the left-hand multivibrator ring triode 27. If the multivibrator ring is running, a signal such as shown in Fig. 10(d) is generated once per multivibrator ring revolution, and the signal will cause triode 62 to conduct, discharging condenser 63 once per revolution. However, when the multivibrator ring is not running, condenser 63 continues to charge through resistance 64 and reaches a high positive potential. Triode 65 is so connected as to be normally non-conducting, whereas triode 65-a is normally conducting. When the charge on condenser 63 becomes sufficiently high, triode 65 will become conducting. In turn, the right-hand triode 65-a will become non-conducting and the anode of this tube will assume a higher positive potential.

This higher positive potential is sufficient to cause the right-hand triode 62-a to become conducting by its grid assuming a more positive potential. Current then flows through the anode of tube 62-a and through resistance 66 in Fig. 3. This flow of current through resistance 66 will depress the anode voltage of multivibrator ring tube 27-a, causing triode 27-a to become conducting. In accordance with the prior description, rendering tube 27-a conducting will cause tube 27 to become non-conducting and start the cyclic operation of the multivibrator ring circuit. Similarly now, the conduction of triode 27-a and subsequent non-conduction of triode 27 will restore triode 62 to conducting condition, discharging condenser 63, and the operation of the multivibrator ring may proceed.

Transmitter synchronization—amplitude carrier modulation system

The function of the electronic distributor and its accompanying stepping and curbing pulse circuits is to sample each channel of the vocoder analyzer successively and repetitively, as described. This sampled output is transmitted over lead 48 and must be so correlated with a synchronizing arrangement as to be usable at the receiver to supply the intelligence to the vocoder synthesizer in an appropriate fashion. It has further been indicated that two types of synchronization form preferred embodiments of the invention. One of these systems employs the use of a carrier which is modulated by the intelligence received by the distributor and thereupon transmitted to the transmission line 3. More especially, the invention contemplates synchronization of the transmitter and receiver by alternate reversal of the phase of the carrier output for each step of the transmitting distributor.

It has been seen that the transmitting distributor may have a stepping frequency of approximately 440 cycles per second and a carrier frequency of 660 cycles per second. When a carrier frequency of 660 cycles is chosen and the superimposed modulation is 440 cycles in width, the ratio of the carrier frequency and the modulation frequency is extremely close, requiring the use of a low-pass filter 5 between the modulator and the modulation signal source. This low-pass filter is a precaution necessary to prevent the formation of asymmetrical sidebands as a result of the modulation process; the modulation process includes the impression of the signal and carrier upon non-linear elements to produce the carrier and sidebands. Low-pass filter 5 theoretically should suppress all frequencies above twice the carrier frequency minus the maximum desired sideband frequency and should have a linear phase characteristic. The output of the transmitting distributor, lead 48, is terminated at the low-pass filter with the aid of resistance 67.

Means must be provided for the generation of a carrier oscillation. It has been found desirable to synchronize the frequency of the carrier to a subharmonic of the 440 cycle pulse oscillator; a high degree of balance is required in the modulator to prevent transmission of the lower harmonics of the modulating signal to the line. In lieu of obtaining a high balance between both carrier and the modulating signal branches as supplied to the modulator, the carrier oscillator may be synchronized to a sub-multiple of the 440 cycle pulse oscillator. The small frequency differences which would ordinarily exist in the harmonic relationship of the pulse oscillator and carrier oscillator is eliminated by this expedient.

Another requirement for the carrier system of synchronization is that the phase of the carrier be shifted 180° for every step of the transmitting distributor. In order that this desired condition may be met, a portion of the output of the pulse amplifier is utilized. It has previously been stated that there will be developed across resistance 33 in Fig. 4, a pulse having a repetition frequency depending upon the pulse oscillator 12. A portion of these pulses are now supplied from the cathode resistance 33 to the grid of an amplifier tube 68 in Fig. 5.

Amplifier 68 is a cathode coupled amplifier corresponding to amplifier 14–a in Fig. 1. The purpose of this cathode coupled amplifier is to decouple the succeeding sub-multiple generating stage from the pulse amplifier and the multivibrator ring circuits.

The pulses derived from the cathode resistance 33 are supplied through the decoupling cathode coupled amplifier 68 to the successive sub-multiple generator stage corresponding to 16 in Fig. 1. The sub-multiple generator comprises a two-segment multivibrator comprising triodes 69, 69–a, 70 and 70–a. The operation of this two-segment multivibrator ring is precisely the same as indicated for the operation of the multivibrator ring of the transmitting distributor. As in the case of the latter, the pulse applied across resistance 68–a in multiple to the ground return circuit of the cathode of the right-hand triodes 69–a and 70–a of the multivibrator ring operates the stepping of the multivibrator.

The output derived from the sub-multiple generator is, as in the case of the previously described transmitting distributor multivibrator ring, a square wave of voltage having a measured duration equal to T, at the anodes of one or the other multivibrator segments. It can be seen that any first given pulse will cause one of the triodes, e. g., 69–a, to become conducting and the corresponding triode 69 to become non-conducting. Upon reception of the succeeding pulse, triode 70–a will now become conducting, rendering triode 70 non-conducting; the second pulse will not affect triodes 69 and 69–a, these remaining in static condition until reception of the third pulse, inasmuch as 69 and 69–a and 70 and 70–a comprise two segments of a ring circuit. As a result, the instantaneous voltage at either anode of one of the ring segments will present the described flat-topped wave only for each second successive pulse transmitted from the pulse amplifier and will, therefore, present an output having a frequency of one-half the fundamental frequency of the pulse oscillator. This will be an output having a frequency of 220 cycles for a pulse-stepping frequency of 440 cycles.

This 220 cycle flat-topped wave is supplied to tuned oscillatory circuit 15. Tuned oscillatory circuit 15 has a natural resonant frequency equivalent to the fundamental frequency of the carrier oscillator. In the case of the carrier oscillator frequency previously designated, this will be 660 cycles. The third harmonic output of the sub-multiple generator is tuned to the resonant frequency of tuned circuit 15 and will energize the tuned circuit by virtue of its third harmonic component. It is to be remembered that the output of the sub-multiple generator was stated as being a square-topped wave, indicating the presence of a large third harmonic. Tuned circuit 15 is coupled to the grid of the successive amplifier stage comprising triode 71. Triode amplifier 71 will provide a sine wave of output having a 660 cycle output stabilized by the 440 cycle pulse oscillator. The output of this amplifying stage which corresponds to 14 in Fig. 1 is supplied to the grid of the carrier oscillator proper.

The carrier oscillator is of conventional design and its frequency is controlled generally by the resonant circuit constants 72 and 72–a located in the grid-cathode and plate-cathode circuits of triode 73. The carrier oscillator corresponds to 13 in Fig. 1. The exact frequency at which the carrier oscillator will operate is in the last analysis determined by the output provided through capacitance 74 from amplifier 71 to the grid of tube 73. The LoC ratio of the tuned constants 72 and 72-a have such a value that the absolute control of frequency can be achieved from the voltage injected by amplifier 71. The output of oscillator 73 is obtained by mutual induction from the coil 73-a interposed in the anode lead of the oscillator.

It has been stated that one method of synchronization of the transmitting and receiving distributors will be to reverse the phase of the carrier oscillator successively for each step of the transmitting distributor. Such phase reversals may then be used at the receiving location to provide articulate synchronizing voltages for the receiving distributor. In order that the phase of the carrier oscillator may be reversed by succeeding steps of the transmitting distributor, the electronic phase-reversing switch corresponding to 18 in Fig. 1 is provided. The phase-reversing switch comprises four diodes 75, 75-a, 76 and 76-a.

These diodes are arranged to provide conduction between the upper terminal of coil 78 to the upper terminal of coil 77 through diode 76-a and from the lower terminal of the coil 78 to the lower terminal of the winding of coil 77 through diode 76. These conducting paths for coils 77 and 78 exist only when diodes 76 and 76-a are conducting. Alternatively, when diodes 75 and 75-a are conducting a path is provided from the upper terminal of coil 77 to the lower terminal of coil 78 through diode 75-a and from the lower terminal of coil 77 to the upper terminal of coil 78 through diode 75. Therefore, depending upon which of the two groups of diodes 76 and 76-a or 75 and 75-a are conducting, coils 77 and 78 will be directly connected terminal for terminal, or will be inversely connected.

Determination as to which of the two groups of diodes will be conducting is dependent upon the polarity of the voltage applied between terminal 78-a of coil 78 and ground. If there is a positive voltage at point 78-a with respect to ground, the anodes of diodes 75 and 75-a will have a positive voltage thereto applied with respect to their cathodes, which are connected to ground through the center tap of coil 77. If point 78-a has a voltage thereon, negative with respect to ground, the anodes of diodes 76 and 76-a will have a positive voltage with respect to their cathodes and will, therefore, be conducting. In turn, the polarity of the voltage existent upon point 78-a will be determined by the polarity of the voltage supplied to it through capacitance 79 from the anode of the sub-multiple generator tube 69.

It has been shown previously that the anode of either of the sub-multiple generator tubes will develop a square-topped wave having a frequency equal to one-half of the frequency of the pulse oscillator, or 220 cycles for a pulse oscillator frequency of 440 cycles. Thus, as the transmitting distributor is stepped from one segment to the next in a given interval of time equal to $\frac{1}{440}$ of a second, the sub-multiple generator will have executed one-half of a cycle which will be equivalent to one square-topped wave. As the transmitting distributor moves again to the next succeeding channel, the sub-multiple generator will complete the half cycle of its square-topped wave of opposite polarity, reversing the phase of the carrier by a reversal of the polarity applied through capacitance 79 to point 78-a with respect to ground. For each succeeding pulse advancing the transmitting distributor one segment, a one-half cycle pulse of the sub-multiple generator will ultimately reverse the phase of the carrier frequency through the medium of the phase-reversing switch.

The output of the carrier frequency oscillator as supplied from the phase-reversing switch is in turn coupled to the balanced modulator. The modulator illustrated in part of Fig. 5 shows one possible balanced construction. The modulator is composed of two diode groups 123 and 123-a; 124 and 124-a. The carrier output received from the phase-reversing switch is applied to the anodes of the first diode group 123 and 123-a in push-pull, and to the cathodes of opposed-connected diodes 124 and 124-a by coupling coils 125. The output of the modulator is coupled by coupling coils 126 to the free ends of the two diode groups. The modulation is derived from the output of the transmitting distributor over lead 48, and through the low-pass filter 67. The output of filter 67 is biased and impressed between the mid-points of coupling coils 125 and 126.

Modulation results from the reduction and reversal of current flow of the carrier signals at periodic intervals as the carrier varies the diode resistance back and forth between high and low values. The diodes are made to become alternatively low and high resistance in pairs as the polarity of the modulating signal varies in direction. As a result, current flow from the carrier input circuit into the output is periodically reversed by provision of a periodically reversing low impedance path. In effect, each signal is balanced from the other's circuit.

As explained in the general description, the band-pass filter 19 will limit the sidebands and extraneous cross-modulation resulting from the modulation process.

*Transmitter synchronization—pulse modulation system*

The second embodiment of the invention employing a pulse modulation system has previously been alluded to. Such a system does not utilize a carrier oscillator, sub-multiple generator, modulator or phase-reversing switch. However, the vocoder, transmitting distributor and its associated stepping and curb pulse circuits are included and will operate precisely in the manner previously described.

The curbing of the signals of the transmitting distributor has previously been explained; each channel of the vocoder is sampled for only a small percentage of the time-width of each distributor segment. As a result, an extremely narrow pulse is produced within each signal element. The operation of the pulse modulation system requires the output of the transmitting distributor to have very highly curbed signals; these will appear as extremely narrow pulses. It is known that repeated narrow pulses will produce approximately equal harmonics, over a wide range of harmonics. According to the invention, the pulse is made narrow enough so that all harmonics of the repeated signals are substantially equal over the range of frequencies that the band-pass filter 19-a of Fig. 1 (a) will transmit. When these equal amplitude harmonics are impressed upon a filter having an appropriate transfer admittance, a carrier envelope will be formed which meets the requirements for distortionless transmission of the sampled vocoder analyzer signals. When an impulse is applied to a symmetrical filter, the filter will oscillate about its mid-band frequencies. An analysis of this oscillation will show that it has a carrier equivalent to the mid-band of frequencies modulated by an envelope equivalent to the amplitude of the pulses applied thereon. The rationalization of such a scheme of shock excitation is to be found in the treatise of H. Nyquist, previously alluded to.

It has been found that the proper transfer admittance is as follows: At frequency deviations on each side of the midband corresponding to one-half the stepping pulse frequency, the transfer admittance should be 0.5 as compared to mid-band if the envelope delay is flat. In addition, the cut-off characteristic should be such that the sum of the transfer admittance magnitudes equally distant above and below the 0.5 point should add to unity.

In the pulse modulation system, then, the apparent carrier is caused by the excitation of band-pass filter 19-a by the highly curbed pulses of the transmitting distributor. This carrier has a modulation envelope representative of the transmitted intelligence to be found within the curbed pulses. The carrier wave synthesized by the shock excitation of band-pass filter 19-a can be employed at the receiver to aid in synchronizing the distributors.

The order of curbing which has been found advantageous is that which presents a pulse having a width approximately 3% of the total time of one distributor segment.

In both systems of synchronization, the output of either the carrier amplitude modulation or the shock-excited pulse modulation system will be supplied to the transmission line 3 via a line amplifier 3-a and will be composed of a range of frequencies, narrow in comparison to the original intelligence supplied to the vocoder analyzer.

Receiver—demodulating circuits

An object of the invention has been stated as being the transmission of speech or intelligence over a band smaller than the frequency range of the speech or intelligence itself. In the accomplishment of this object, the transmission line employed between the transmitter already described and receiver to be described may well carry signals of other frequencies than those necessary to the operation of the system according to the invention. Referring to Fig. 2, in order that signals of extraneous frequencies generally may be eliminated, a band-pass filter 20 is provided, coupled to the transmission line 3 through line amplifier 3-b. The received signal is then supplied to a demodulator 20-a.

The demodulator has its input inductively coupled by coils 80 to triode amplifiers 81 and 81-a operated in push-pull. These triode amplifiers, in turn, supply the grid circuit of push-pull connected pentode amplifiers 82 and 82-a. Resistance-capacitance networks 83 and 83-a provide a negative feed-back voltage to the cathode circuits of triode amplifiers 81 and 81-a, improving the overall linearity of the two stages of amplification. The two stages of push-pull amplification are inductively coupled through coils 84 to diode rectifiers 85 and 85-a which operate as diode demodulators, demodulating the signal presented to them by virtue of their non-linear characteristic, in a known manner.

The demodulated signal passes then to low-pass filter 21, eliminating the rectified carrier frequencies and leaving only the envelope values of the received signals. Resistance 86 is used to provide a proper termination for the low-pass filter 21.

The output of low-pass filter 21 is then supplied to a cathode-follower amplifier comprising triode 87. The cathode of amplifier 87 supplies the various transmitted pulses representing the intelligence derived from the transmitting distributor in multiple to the gate circuits of the receiving distributor, over lead 88. In addition, this same output of the cathode of amplifier 87 is used to supply the various synchronizing circuits, over lead 88-a.

Receiving distributor

A receiving distributor is required which can interpret the signals arriving on the transmission line by connecting the transmission line to the appropriate channel of the vocoder synthesizer at points of time corresponding to the sampling of the transmitting distributor. There is shown in Figs. 2 and 7 a vocoder synthesizer having input terminals 2-a to 2-j to which it is desired to apply voltages corresponding to the voltages at terminals 1-a to 1-j of the vocoder analyzer. The voltages are applied to the terminals 2-a and 2-j to control the energy in various frequency bands of the synthesized signal. The synthesizer is also provided with a terminal 2-k which controls the pitch of the synthesized signal. It is desired to apply to this terminal a voltage coresponding to that appearing at terminal 1-k of the vocoder analyzer.

The path of signals derived at the receiver from the transmission line ultimately terminates at the cathode circuit of amplifier 87 in multiple over lead 88 to the gate circuits of the receiving distributor. This receiving distributor is generally shown at 22 in Fig. 2. Referring to Fig. 2, each of the gate circuits includes a double triode as 89 and 89-a; and 90 and 90-a. While only two such gate circuits are shown in the receiving distributor, a double triode will be necessary in each of the channels to be successively connected to the vocoder. The anodes of each of the gate tubes are connected to a positive direct-current supply. A condenser such as 92 is connected between the cathode of the left-hand gate triode as 89 and ground. The control grid of left-hand triode 89 is connected at the common conjunction of three resistances 91-a, 91-b and 91-c. The resistor 91-b is connected to a source of negative biasing potential. The resistor 90-a is cascaded to the output of the amplifier 87. It will be shown later that a positive 150-microsecond gate pulse is applied from the receiving distributor ring circuit over lead 93 and through resistance 91-c to the grid of triode 89. These positive 150-microsecond gate pulses will be shown provided to each of the left-hand gate triodes in succession, at a frequency equivalent to the frequency of the stepping pulse of the transmitting distributor.

When the gate pulse is not being delivered to triode 89, the negative bias source applied via resistance 91-b to the control grid of triode 89 is sufficient to prevent conduction of the left-hand triode. Upon application of the 150-microsecond gate pulse via resistance 91-c, conduction will take place. The three resistors 91-a, 91-b and 91-c act as an adding circuit; the net voltage applied to the control grid of the left-hand triode 89 is proportional to the algebraic sum of the bias voltage, the gate voltage and the output signal from the amplifier 87. Since the gate voltage and the bias voltage have substantially the same value each cycle, it is the signal from the amplifier 87 which will produce variations from cycle to cycle in the anode current of the left-hand gate 89.

At some time in the distributor cycle, before triode 89 conducts, condenser 92 will be discharged.

Condenser 92 is discharged through the "discharge" triode 106. Discharge triode 106 is normally biased negatively beyond cut-off. The voltage on the grid of triode 106 is a mixture of the 150-microsecond gate pulse obtained through resistance 106-a from lead 93, a 50-microsecond stepping pulse received from a source later to be described through resistance 106-c, and a negative bias voltage received through resistance 106-b. Resistances 106-a, 106-b and 106-c have magnitude values at which both the 50- and 150-microsecond pulse must simultaneously appear in order that triode 106 will be conducting. When triode 106 does conduct, capacitance 92 will be discharged.

Capacitance 92 will thereafter immediately be charged to a voltage dependent upon the voltage output from amplifier 87. That is, since the conducting interval of the left-hand triode of the gate tube is the same each cycle, and since variation in the amplitude of the current flowing is determined by the signal derived from amplifier 87, the capacitance 92 will become charged to a voltage, a function of the signal received from amplifier 87. In view of synchronizing features to be described, the voltage appearing on condenser 92 is similar to the voltage appearing on the terminal 1-a of the vocoder analyzer 1-a located at the transmitting position.

The right-hand gate triode 89-a comprises a cathode-follower amplifier, and the voltage on condenser 92 is coupled to the grid of 89-a and thence to the cathode coupling circuit to a low-pass filter associated with the appropriate input terminal 2-a of the vocoder synthesizer.

It has been seen that the gate tubes require a 150-microsecond gate pulse applied to the control grid of their various left-hand triodes sequentially and in repetitive cycle to provide proper distribution. In addition, a 50-microsecond pulse timed with the 150-microsecond pulse has been found necessary for the operation of the discharge tube. In order that these pulses may be generated, a local oscillator 23 in Fig. 2 is provided, operating much in the manner of the transmitting distributor oscillator. To synchronize, it will be found necessary to interlock the frequencies of the local receiver oscillator 23 and the transmitting oscillator 12.

Referring to Fig. 6, triode 94 has associated with it a tuned circuit 94-a which is approximately tuned to the same frequency as the transmitting distributor oscillator 12 in Fig. 1. This tuned circuit will later be shown as complemented by a variable reactance which is a function of a synchronizing voltage derived from the frequency of the transmitting distributor oscillator, locking the local receiver oscillator and the transmitting oscillator 12. The output of oscillator triode 94 will be supplied through cathode-coupled amplifier triode 95, to the grid of triode 96.

Triodes 96 and 96-a comprise a squaring circuit whose operation is similar to that described in connection with triodes 43 and 43-a of Fig. 4. The receiver squaring circuit corresponds to the squaring circuit 24 in Fig. 2. The output derived from the right-hand triode 96-a of the squaring circuit will give a resulting clipped signal as shown in Fig 12(a).

The derived output is then applied to a pulse generator or single vibrator having triodes 97 and 97-a adapted to produce a positive 50-microsecond pulse at the anode of left-hand triode 97, each time the control grid of triode 97 is driven negative. This 50-microsecond pulse has a waveform as shown at Fig. 12(b).

The 50-microsecond pulse obtained from the pulse generator is supplied in multiple to the control grid of each of three cathode-follower amplifiers 98-a, 98-b, and 98-c. These cathode-follower amplifiers provide the 50-microsecond stepping pulse to various parts of the circuit.

Cathode-follower 98-c supplies the 50-microsecond pulse in multiple necessary for the operation of the various discharge tubes of the receiving distributor, as triode 106 in Fig. 7.

Cathode-follower 98-b supplies the 50-microsecond pulse in multiple to the cathodes of the right-hand gate pulse generator tubes shown in Fig. 7. Triodes 99 and 99-a; and 100 and 100-a comprise two of the gate pulse generator tubes utilized in individual single vibrators of the single trip type. One gate pulse generator single vibrator will be required for each of the gate tubes. The gate pulse generator operates in a manner similar to the other single vibrators previously described such as the pulse generators 97 and 97-a and 46 and 46-a shown in Fig. 4.

The stepping pulse signal is supplied from the cathode-follower stepping pulse amplifier 98-b through capacitance 102 to the grids of triode 103.

It has been found desirable to have the circuit parameters of the various single vibrators as 99 and 99-a produce 150-microsecond pulses having a wave shape as shown in Fig. 13. These pulses are obtained from the anode of the left-hand triodes of the single vibrators to leads corresponding to 93.

The utilization of this 150-microsecond pulse has previously been described. During the period of time before and during the generation of the 150-microsecond pulse, the capacitance 102-b in the cathode circuit of the right-hand triode 99-a charges rapidly.

Means must be provided to step the receiving distributor from segment to segment.

A "prepare" triode 103 has its control grid inserted in the resistance-capacitance network comprised of 102, 102-a, 102-b and 102-c. The time constants of the resistance-capacitance network are chosen having values at which the voltage at the grid of prepare tube 103 rises to a maximum in a time corresponding to about one signal element and falls back to approximately zero in a time corresponding to a little less than one revolution of the distributor; one revolution of the distributor comprises a complete sequence of operations for each of the gate pulse generators and their associated gate tubes. When the grid of the prepare tube reaches its maximum value, a 50-microsecond timing pulse is also supplied to it from cathode-follower amplifier 98-b. This pulse is thereupon amplified, as prepare tube 103 will now be conducting, and is applied through capacitance 105, over lead 104-a, to the grid of the right-hand triode of the gate pulse generator in the second segment of the gate pulse generator ring. To aid in the understanding of the system, segments 2 through 10 are not represented. The second segment of the gate pulse generator ring is, in turn, triggered and the process described in regard to gate pulse triodes 99 and 99–a is repeated in each segment of the gate pulse generator ring through the next to last or eleventh segment.

In the next to last or eleventh segment of the receiving distributor, the triggering voltage is supplied from the succeeding prepare tube to the grid of right-hand triode 100–a over lead 123. No provision is made to trigger a succeeding or twelfth segment from a prepare tube as employed in the other segments. As has previously been stated, the transmitting and receiving distributors must be locked together both as to the frequency of rotation or stepping rate and the phase of the transmitting and receiving distributors must be the same. Thus, when the transmitting distributor is sampling a particular channel of the vocoder analyzer, the receiving distributor must be connecting the transmission line to the same channel of the vocoder synthesizer. If this channel to channel position is not relatively maintained, the transmission of the speech or sound cannot be properly achieved. The general plan will be to arrest the receiving distributor in its rotation upon completion of the eleventh segment and will reinitiate the receiving distributor cycle upon reception of a synchronizing pulse from the transmitting distributor.

*Receiving distributor synchronization*

In the description of the transmitter, it has been indicated that the phase of the transmitted signal is reversed 180° as each step of the transmitting distributor advances one segment. After demodulation of the received signal, the output of low-pass filter 21 in Fig. 6 will possess signals which may be phase-differentiated with each successive transmitted segment. For example, if four succeeding signal elements are transmitted from the transmitting distributor, then four separate signals, articulate in phase, are received at the input to the gate circuit of the receiving distributor through the amplifier 87. To simplify discussion, it will be assumed, in connection with the synchronization, that no signals are being transmitted by the vocoder and that the sole transmission is that provided from the channel continuously supplied with a constant amplitude signal, the twelfth channel. In addition, the local oscillator previously described should be tuned approximately to the desired stepping frequency by adjustment of the tuned circuit 94–a shown in Fig. 6. If it is assumed that no channel but the twelfth or synchronizing pulse channel has a signal present therein, an analysis of the voltage at the output of the amplifier 87 will have a wave shape as shown in Fig. 14(a).

This pulse is supplied over lead 83–a to the control grid of pentode 107 shown in Fig. 8. Pentode 107 is connected as a differentiator tube, differentiating each succeeding phase-reversed segment. The control grid of pentode 107 is biased so that the tube will be conducting over only a small portion of the signal applied to the control grid; approximately the upper one-quarter of the applied signal as shown in Fig. 14(a). The plate current of pentode 107 will be proportional to the input voltage applied thereto and hence the voltage developed across the plate inductance 107–a will be proportional to the rate of change of the control grid voltage. Fig. 14(b) shows this differentiated wave; it should be noted that this wave is shown as having the property of passing through zero at the center of the synchronizing pulse received in the twelfth segment or channel. The differentiated wave is then applied to amplifier tube 108, where the phase of the signal will be reversed as shown in Fig. 14(c). The output of the amplifier 108 is then applied to two pairs of gate diodes, 109 and 109–a; 110 and 110–a; coupled in a parallel opposed circuit. The gates are normally closed, biased to cut-off by the negative supply 113.

It has previously been assumed that the local oscillator will have a natural resonant frequency in the neighborhood of that of the transmitting oscillator, as determined by tuned circuit 94–a. Assuming a stepping frequency of 440 cycles, the local oscillator will resonate 440 cycles and after passing through the squaring circuit and pulse generator, previously described in connection with the stepping pulse circuits, a 50-microsecond pulse will be provided at the output of cathode-follower 98–a. This 50-microsecond pulse is then applied to the grid of pentode amplifier 111 shown in Fig. 8. The 50-microsecond gating pulse is applied through gate amplifier 111 to transformer 112, having its primary coupled in the cathode circuit of the gate amplifier 111. The secondary of the transformer 112 is coupled between the cathodes of gate diodes 109 and 110 and the anodes of diodes 109–a and 110–a. The effect of the gating pulse will be to overcome the negative bias supply 113 and thus the gating diodes conduct.

The differentiated signal has previously been described as being supplied from the amplifier triode 108 to the gate diodes. This differentiated pulse will be developed across resistance 114. At such a moment of time as the 50-microsecond gating pulse from transformer 112 and the center of the synchronizing pulse from amplifier 108 occur simultaneously, the voltage across resistor 114 will be zero, as the center of the synchronizing pulse is passing through zero potential. The relative timing of the 50-microsecond gating pulse and the differentiated synchronizing pulse will be seen in Fig. 14(c) and Fig. 14(d); the gating pulse is shown at Fig. 14(d), the synchronizing pulse at Fig. 14(c). If any charge exists on condenser 115, that charge will be leaked off through the diodes and resistor 114 to ground. However, if the 50-microsecond gating pulse occurs at a time before or after the center of the synchronizing pulse, a positive or negative voltage will be developed across resistance 114 depending upon which side of the center of the synchronizing pulse the gate pulse occurs. For example, if the gate pulse occurs early or before the differentiated voltage passes through zero, a positive voltage will ultimately be applied to condenser 115; if the pulse occurs late, a negative voltage will be applied to condenser 115.

Referring again to Fig. 8, hexode 116 is a reactance tube, well known per se, having as its objective the injection of a variable reactance into an associated network. According to the invention, this reactance is injected into the associated network forming the tuned circuit 94–a of the local receiving oscillator shown in Fig. 6. The anode current of the reactance tube 116 is controlled by the voltage developed across capacitance 115, which will appear across one of its grids. This anode current will lead the voltage developed across quadrature network 116–a and 116–b by 90°. In turn, when this voltage is applied over lead 117 to the tuned circuit 94–a of the oscillator shown in Fig. 6, the result will be a change in the frequency of the local oscillator in accordance with a change in the value of the apparent capacitance which is placed in parallel with the said tuned circuit.

The amount of the injected capacity is a function of the mutual transconductance of the reactance tube and the magnitude of the values of the quadrature network 116-a and 116-b. Hence, by controlling the voltage across capacitance 115, and the resultant manipulation of the mutual transconductance of the reactance tube, the value of the injected capacity can be altered and the frequency of the local oscillator can be controlled.

When tuning the local receiving oscillator to the approximate desired frequency, e. g., 440 cycles, a ground may be applied across capacitance 115, through grounding key 115-a. Inasmuch as this will reduce the voltage across capacitance 115 to zero, the reactance tube will provide the same value of injected capacity as if the gating pulse scanned the differentiated synchronizing pulse at the center of the signal element as previously described. The receiver oscilator can then be tuned to approximately the same frequency as that of the transmitting oscillator, allowing a primary adjustment without the interference of the automatic frequency control.

To summarize, if the local oscillator frequency should drift from that of the transmitting oscillator, a voltage of appropriate polarity and magnitude will be provided through the differentiator and diode gates to capacitance 115, causing the reactance tube to inject a virtual capacity in the tuned circuit of the local receiving oscillator, restoring the local receiving oscillator to a frequency identical with that of the transmitting oscillator.

To provide the necessary phase relationship between the receiving and transmitting distributors, it will be necessary to control the relative instantaneous positions of the transmitting and receiving distributors. It has previously been stated that the receiving distributor ring is open between the next to last or eleventh segment and the last or twelfth segment. As a result, the receiving distributor makes one revolution as far as the eleventh segment and stops. Upon the completion of the eleventh segment, all of the intelligence to be supplied the vocoder synthesizer for one distributor cycle, has been dispatched; the twelfth segment corresponds to the synchronizing signal supplied at the transmitter by the constant amplitude source.

The reinitiation of the receiving distributor cycle is timed to coincide with three events: the arrival of the receiving distributor at the completion of the eleventh segment; the reception of the constant amplitude synchronizing pulse; and the 50-microsecond stepping pulse. If the distributor arrives at the completion of the eleventh segment first, the reinitiating circuits will await the other two events; if the completion of the eleventh segment is delayed until after either of the other two events, the receiving distributor will be arrested through the next transmitted cycle until the succeeding synchronizing and stepping pulses are received.

A "start gate multivibrator" comprising triodes 118 and 118-a is provided. Triodes 118 and 118-a are connected to have two conditions of stability; one of the triodes is conducting while the other is non-conducting. In the first condition of stability, triode 118 is conducting, triode 118-a non-conducting. When the receiving distributor reaches the completion of the eleventh segment, the left-hand triode 100 returns from the non-conducting to the conducting condition in accordance with the previous description of the receiving distributor gate pulse generating tubes. The anode of tube 100 will develop a negative pulse through the drop in anode voltage caused by conduction. This negative pulse is applied through capacitance 122 to the control grid of triode 118, causing triode 118 to become non-conducting and triode 118-a to become non-conducting, the second condition of stability. As a result, triode 118 will then approach full anode supply potential through the decrease drop across resistance 119.

This potential change at the anode of triode 118 will be applied through resistance 120-b to the control grid of triode 120, called the "start tube." The start tube 120 has applied to its grid the voltage corresponding to the anode voltage of triode 118 in combination with a portion of the signal supplied from amplifier 87 over lead 88-a through resistance 120-c; with the 50-microsecond pulse received from stepping pulse amplifier 98-a through capacitance 120-d; and with a direct-current negative bias applied through rheostat 120-e. When the incoming synchronizing pulse is received and adds with the stepping pulse from the cathode-follower 98-a and the anode voltage of triode 118 in non-conducting condition, the algebraic sum of these is sufficient to overcome the negative bias supplied through rheostat 120-e. As a result, the start tube 120 will conduct. Conduction of 120 produces a negative signal resultant from the decreased drop across anode supply resistance 120-f; the negative signal is applied through capacitance 120-a to the control grid of the right-hand gate pulse generator tube 124 of the twelfth or final segment.

The negative voltage applied to the grid of triode 124 causes 124 to become non-conducting; 124-a will thereupon become non-conducting. The succeeding stepping pulse advancing the receiving distrbutor will return triodes 124 and 124-a to the static condition and prepare tube 105 will act as described with regard to prepare tubes 103 to continue the operation of the receiving distributor by providing a positive pulse to the grid of the right-hand gate tube 99-a. Meanwhile, the anode voltage decay resultant from triode 124 becoming again conducting provides a negative pulse that is supplied through capacitance 121 to the control grid of triode 118-a; triodes 118 and 118-a will return to the first condition of stability. In turn then, the anode voltage of triode 118 will be lowered and the voltage applied from this anode to the grid of start tube 120, together with the direct-current bias, will lower its grid below the cut-off point irrespective of pulses received from the line through resistance 120-c of the stepping pulses received through capacitance 120-a. Thus, stepping pulses and line signals existing during the subsequent rotation of the receiving distributor through segments 1 through 11 will not affect the start tube 120 until the eleventh segment has been completed, as previously indicated.

When the receiving distributor is to be started originally, key 101 is closed, providing a negative voltage to the control grid of triode 118. The start tube 120 will then be prepared for the reception of the first synchronizing and stepping pulse, and the receiving distributor may commence normal operation.

It is possible to obtain privacy between given transmitting and receiving systems in several ways. For example, if the connections between vocoder channels and distributor segments are concurrently altered in both transmitting and receiving positions, a third receiving or transmitting position, familiar with the other systems before alteration, would be required to know the new relative connections between the vocoder channels and distributor segments to interrupt the privacy of the original transmitting and receiving positions.

Although the invention has been illustrated as being applied to particular systems, it is of course obvious to those skilled in the art that variations may be made without departing from the spirit and scope of the present invention.

What is claimed is:

1. In a communication system, a communication channel, a filter for passing a predetermined band of frequencies to said channel, filter means connected to said channel and generating harmonic frequencies representing carrier currents upon excitation by a succession of pulses of short duration by comparison with the interval between pulses, transmitter means for impressing on said filter means such a succession of said pulses representing message material, means for receiving said carrier currents, means for detecting the pulse conditions represented by said carrier currents, and means for deriving and reproducing the message material represented by said pulse conditions.

2. In a communication system, a transmitting station including an electronic distributor and a source of intelligence signals, an oscillator for driving said distributor, means controlled by said distributor for transmitting alternating current representative of intelligence signals, means for causing the phase of said alternating current to be reversed for alternate segments of said distributor, a receiving station including an electronic distributor, a communication channel linking said stations, an oscillator for driving said last-mentioned distributor, demodulation means adapted to derive a peaked pulse representing an intelligence signal for each alternating-current phase reversal, and means controlled by said peaked pulses for controlling the frequency of said second-mentioned oscillator to establish and maintain synchronism between said second-mentioned oscillator and said first-mentioned oscillator.

3. A communication system comprising a plurality of sources of desired intelligence, a medium of transmission, scanning means to derive a succession of pulses representative of characteristics of the said desired intelligence and having a given interval between each of said successive pulses, means to supply carrier synchronizing information in accordance with a characteristic dissimilarity of any two successive ones of said pulses, means to supply said pulses and synchronizing information to the said medium of transmission, means for receiving the said pulses and synchronizing information, means for deriving and reproducing the said desired intelligence from the said pulses and synchronizing information, and regulating means controlled in accordance with said synchronizing information for synchronizing said pulse receiving and intelligence deriving means with said scrapping means.

4. A communication system comprising, a communication channel, a filter coupled to said channel having characteristics at which a predetermined band of frequencies will be supplied to the said channel and excitable by a succession of applied pulses to generate harmonic frequencies, means for impressing on said filter a succession of pulses representing message material and having a given interval between each successive pulse, said latter pulses having a time duration of a given fractional part of the said interval between the said pulses and having a value at which the said filter is excited to generate harmonic frequencies representing carrier currents to be transmitted over the said channel, means for receiving said carrier currents, means for detecting the pulse conditions represented by the said carrier currents, and means for deriving and reproducing the message material represented by said pulse conditions.

5. In a communication system, a transmission medium, a filter coupled to said transmission medium having cut-off characteristics at which a predetermined band of frequencies will be supplied to the said medium, means to derive a succession of pulses having modulation components of intelligence with a given interval between successive pulses, means to curb said latter pulses to a time duration a fraction of the said interval between the said successive pulses, means to apply said curbed pulses to the said filter, said filter having a value of admittance at which harmonic frequencies representing carrier currents are generated solely by shock excitation of the said filter by said pulses, means to apply the said derived carrier currents to the transmission medium, means to receive and demodulate the said carrier currents, means for detecting the pulse conditions represented by the said carrier currents, and means for deriving and reproducing the intelligence represented by said pulses.

6. A communication system comprising, a transmitting medium, a source of desired intelligence signals, a transmitting station including a first electronic distributor, a first oscillator for driving said distributor, means controlled by said distributor for transmitting alternating current representative of the said source of intelligence signals, means to reverse the phase of said alternating current in accordance with alternate segments of the said distributor, a receiving station having a second electronic distributor, a second oscillator for driving said second electronic distributor, demodulation means coupled to the said second electronic distributor adapted to derive a peaked pulse representing an intelligence signal for each alternating-current phase reversal, means controlled by the said peaked pulse for controlling the frequency of said second oscillator thereby to cause operation in synchronism of said first and second oscillator and the distributors driven by them, and means to derive the desired intelligence signals from the said second electronic distributor.

7. In a communication system, a transmitting medium, a source of desired signals, a first electronic distributor, a first oscillator driving said distributor, means to couple said source of desired signals to the said first electronic distributor to derive a succession of pulses representative of the intelligence of the said desired signals and having a given interval between each successive pulse, means to curb the said successive pulses to a time duration of a fraction of the said interval between the said pulses, a band-pass filter adapted to transmit a predetermined band of frequencies, means to supply said successive pulses to the band-pass filter, said band-pass filter having a characteristic admittance value at which the filter will generate oscillations about the mid-band of frequencies representing the repetition rate of the said successive pulses, means to impress said oscillations on the transmitting medium, means for receiving said oscillations from the said transmitting medium, means for demodulating the pulse conditions represented by the said oscillations, a second electronic distributor coupled to the said receiving means, a second oscillator for driving said second electronic distributor, demodulation means adapted to derive a peaked pulse discretely representing one of the desired signals for each oscillation, means coupled to the said demodulation means for controlling the frequency of the second oscillator whereby said first and second oscillators are synchronized, and means to derive the transmitted plurality of desired signals from the said second electronic distributor.

8. In a communication system, a transmitting medium, a source of desired signals, a source of synchronizing signals, a first electronic distributor, a first oscillator for driving said distributor, means to couple said source of desired signals and synchronizing signals to the said first electronic ditributor to derive a succession of pulses representative of the intelligence of the said desired signals and synchronizing signals and having a given interval between each successive pulse, means to curb the said successive pulses to a time duration of a predetermined fraction of the said interval between the said pulses, a band-pass filter adapted to transmit a predetermined band of frequencies, means to supply said successive pulses to the band-pass filter, said band-pass filter having a value of characteristic admittance at which the filter will generate oscillations about the mid-band of frequencies representing the repetition rate of the said successive pulses, means for impressing said oscillations on the transmitting medium, means for receiving said oscillations from the said transmitting medium, means for demodulating the pulse conditions represented by the said oscillations, a second electronic distributor coupled to the said receiving means, a second oscillator for driving said second electronic distributor, demodulation means adapted to derive a peaked pulse discretely representing one of the desired signals for each oscillation, means coupled to the said demodulation means for controlling the frequency of the second oscillator whereby said first and second oscillators are synchronized as to frequency, means to provide a control voltage representing the synchronizing signal, means coupled to the said control voltage to arrest and start said second electronic distributor in phase with the said first electronic distributor, and means coupled to the said second electronic distributor to derive the transmitted signals.

9. In a communication system adapted to transmit a plurality of signal intelligences over a transmission medium, circuits comprising a first plurality of electronic gates coupled severally to sources of signal intelligences, means to open said electronic gates successively at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, means to curb the opening of the said electronic gates to a fraction of the time of successive gate openings, a band-pass filter, means to apply the curbed and gated signal intelligences successively to the said band-pass filter whereby said filter undergoes shock excitation and consequently generates harmonic frequencies representing carrier currents to be transmitted over the transmission medium, means to receive the said carrier currents, means to demodulate the said received carrier currents, a second plurality of electronic gates having the demodulated carrier applied thereto, second multivibrator stepping circuits coupled to and successively opening the said second electronic gates, means to derive a second source of stepping pulses controlled in frequency by the repetitious excitation of the said band-pass filter, means to apply the stepping pulses derived from said second source to the said second stepping circuits, and means to derive the said plurality of signal intelligences.

10. In a communication system adapted to transmit a plurality of signal intelligences over a transmission medium, circuits comprising a first plurality of electronic gates coupled severally to sources of signal intelligences, means to open said electronic gates successively at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, a source of carrier oscillations, means to reverse the phase of the said carrier oscillations alternately for each successive opening of the electronic gates, means to modulate said alternating carrier oscillations in accordance with the gated signal intelligences of the said electronic gates, means to apply the modulated carrier oscillations to the transmission medium, means to receive said modulated carrier oscillations, means to demodulate the said received carrier currents, a second plurality of electronic gates having the demodulated carrier envelope applied thereto, second multivibrator stepping circuits coupled to open successively the said second electronic gates, means to derive a second source of stepping pulses controlled in frequency by the said alternating phase reversals of the received carrier, means to apply the stepping pulses derived from said second source to the said second stepping circuits, and means to derive the transmitted plurality of signal intelligences.

11. In a communication system adapted to transmit audible sounds, a vocoder analyzer deriving a plurality of signal intelligences representative of the audible sounds, a transmission medium, a first plurality of electronic gates coupled severally to said vocoder analyzer, means to open said electronic gates successively at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, means to curb the opening of the said electronic gates to a fraction of the time of successive gate openings, a band-pass filter, means to apply the curbed and gated signal intelligences to the said band-pass filter whereby said filter undergoes shock excitation and consequently generates harmonic frequencies representing carrier currents to be transmitted over the transmission medium, means to receive the said carrier currents, means to demodulate the said received carrier currents, a second plurality of electronic gates having the demodulated received carrier currents supplied thereto, second multivibrator stepping circuits coupled to open successively the said second electronic gates, means to derive a second source of stepping pulses controlled in frequency by the articulate excitation of the said band-pass filter, means to apply the said second source of stepping pulses to the said second stepping multivibrator and a vocoder synthesizer coupled to the said second electronic gates whereby the audible sounds are reproduced.

12. In a communication system adapted to transmit audible sounds, a vocoder analyzer deriving a plurality of signal intelligences representative of the audible sounds, a transmission medium, a first plurality of electronic gates coupled severally to said vocoder analyzer, means to open successively said electronic gates at a given frequency, said latter means comprising a first multivibrator stepping circuits coupled to each of the said electronic gates and to each other in a ring, a first source of stepping pulses having a frequency equivalent to the said opening frequency of the electronic gates coupled to the said stepping circuits, a source of carrier oscillations, means to reverse the phase of the said carrier oscillations alternately for each successive opening of the electronic gates, means to modulate said alternating carrier oscillations in accordance with the gated signal intelligences of the said electronic gates, means to apply the modulated carrier oscillations to the transmission medium, means to receive said modulated carrier oscillations, means to demodulate the said received carrier currents, a second plurality of electronic gates having the demodulated carrier envelope applied thereto, second multivibrator stepping circuits coupled to the said second electronic gates, means to derive a second source of stepping pulses controlled in frequency by the said alternating phase reversals of the received carrier, means to apply the said derived second source of stepping pulses to the said second stepping circuits, and a vocoder synthesizer coupled to the said second plurality of electronic gates whereby the audible sounds are recreated.

13. In a communication system adapted to transmit a plurality of signal intelligences over a transmission medium, circuits comprising a first plurality of electronic gates coupled severally to sources of signal intelligences, means to open successively said electronic gates at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, means to curb the opening of the said electronic gates to a fraction of the time of successive gate openings, a band-pass filter coupled to the transmission medium, means to apply the curbed and gated signal intelligences successively to the said band-pass filter whereby said filter undergoes shock excitation and consequently generates harmonic frequencies representing carrier currents opposite in phase for successive signal intelligences to be transmitted over the transmission medium, means to receive the said carrier currents, means to demodulate the said received carrier currents, a second plurality of electronic gates having the demodulated received carrier currents supplied thereto, second multivibrator stepping circuits coupled to the said second electronic gates, means to derive a second source of stepping pulses, said latter means having a local oscillator including a tuned oscillatory circuit providing said pulses, a reactance tube coupled to the tuned oscillatory circuit of the said local oscillator, means to derive a control voltage proportional to the difference of the frequency of the phase reversal of the said received carrier relative to the frequency of said local oscillator, means to apply the said control voltage to the said reactance tube whereby the said frequency of the local oscillator and the phase reversal of the received carrier are synchronized, and means to derive the transmitted plurality of signal intelligences from the said second stepping circuit.

14. In a communication system adapted to transmit a plurality of signal intelligences over a transmission medium, circuits comprising a first plurality of electronic gates coupled severally to sources of signal intelligences, means to open successively said electronic gates at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, a source of carrier oscillations, means to reverse the phase of the said carrier oscillations alternately for each successive opening of the electronic gates, means to modulate said alternating carrier oscillations in accordance with the gated signal intelligences of the said electronic gates, means to apply the modulated carrier oscillations to the transmission medium, means to receive said modulated carrier oscillations, means to demodulate the said received carrier currents, a second plurality of electronic gates having the demodulated carrier envelope applied thereto, second multivibrator stepping circuits coupled to the said second electronic gates, means to derive a second source of stepping pulses, said latter means having a local oscillator including a tuned oscillatory circuit providing said pulses, a reactance tube coupled to the tuned oscillatory circuit of the said local oscillator, means to derive a control voltage proportional to the difference of the frequency of the local oscillator and the frequency of the phase reversal of the said received carrier, means to apply the said control voltage to the said reactance tube whereby the said frequency of the local oscillator and the phase reversal of the received carrier are synchronized, and means to derive the transmitted plurality of signal intelligences from the said second stepping circuit.

15. In a communication system adapted to transmit audible sounds, a vocoder analyzer to provide a plurality of signal intelligences representative of the audible sounds, a transmission medium, a source of synchronizing signals, a first plurality of electronic gates coupled severally to said vocoder analyzer and to the source of synchronizing signals, means to open said electronic gates successively at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, means to curb the opening of the said electronic gates to a fraction of the time of successive gate openings, a band-pass filter, means to apply the curbed and gated signal intelligences successively to the said band-pass filter, said band-pass filter having a value of admittance at which harmonic frequencies are generated representing carrier currents opposite in phase for successive signal intelligences to be transmitted over the transmission medium, means to receive the said carrier currents, means to demodulate the said received carrier currents, a second plurality of electronic gates having the demodulated received carrier currents supplied thereto, second multivibrator stepping circuits coupled to the said second electronic gates and interconnected in an open ring, means to derive a second source of stepping pulses, said latter means having a local oscillator providing said pulses, a reactance tube coupled thereto, means to derive a control voltage proportional to the difference of the frequency of the local oscillator and the frequency of the phase reversal of the said received carrier, means to apply the said control voltage to the said reactance tube whereby the said frequency of the local oscillator and the phase reversal of the received carrier are synchronized, means to derive a starting signal from the said demodulated carrier pulses, the local oscillator and the open end of the said second stepping pulse circuit, means to apply said starting signal to the second stepping pulse circuits whereby the said first and second electronic gates are placed in phase, and a vocoder synthesizer coupled to the said second electronic gates whereby the audible sounds are reproduced.

16. In a communication system adapted to transmit audible sounds, a vocoder analyzer to provide a plurality of signal intelligences representative of the audible sounds, a transmission medium, a first plurality of electronic gates coupled severally to the signal intelligences, means to open said electronic gates successively and at a given frequency, said latter means comprising first multivibrator stepping circuits coupled to each of the said electronic gates and to each other in a ring, a first source of stepping pulses having a frequency equivalent to the said opening frequency of the electronic gates coupled to the said stepping circuits, a source of carrier oscillations, means to reverse the phase of the said carrier oscillations alternately for each successive opening of the electronic gates, means to modulate said alternating carrier oscillations in accordance with the gated signal intelligences of the said electronic gates, means to apply the modulated carrier oscillations to the transmission medium, means to receive said modulated carrier oscillations, means to demodulate the said received carrier currents, a second plurality of electronic gates having the demodulated carrier envelope applied thereto, second multivibrator stepping circuits coupled to the said second electronic gates and interconnected in an open ring, means to derive a second source of stepping pulses, said latter means having a local oscillator providing said pulses, a reactance tube coupled thereto, means to derive a control voltage proportional to the difference of the frequency of the local oscillator and the frequency of the phase reversal of the said received carrier, means to apply the said control voltage to the said reactance tube whereby the said frequency of the local oscillator and the phase reversal of the received carrier are synchronized, means to derive a starting signal from the said demodulated carrier pulses, the local oscillator and the open end of the said second stepping pulse circuit, means to apply said starting signal to the second stepping pulse circuits whereby the said first and second electronic gates are placed in phase, and a vocoder synthesizer coupled to the said second electronic gates whereby the audible sounds are reproduced.

17. A method of communicating audible sounds comprising the steps of continuously analyzing the audible sounds to discriminate the characteristics thereof into bands of intelligence; successively and repetitively selecting the discriminated bands of intelligence; generating a carrier wave having a phase reversal concurrent with each of the said successive selections of bands of intelligence; modulating the said carrier wave in accordance with the successive bands of intelligence and a subjoined synchronizing pulse occurring with each repetitive selection; transmitting said modulated carrier wave; receiving and demodulating the said transmitted wave; differentiating the concurrent phase reversals of the transmitted carrier wave; utilizing said demodulated wave to recreate the bands of intelligence by distributing the demodulated wave with recourse to the subjoined synchronizing signal and the differentiated concurrent phase reversals of the carrier wave; and synthesizing from the recreated bands of intelligence an audible sound substantially corresponding to the said original sound.

18. A method of communicating audible sounds comprising the steps of continuously analyzing the audible sounds to discriminate the characteristics thereof into bands of intelligence; successively and repetitively selecting the discriminated bands of intelligence; generating pulsed voltages representative of the selected bands of intelligence; propagating an articulated carrier wave induced by the said pulsed voltages and modulated in accordance with the successive bands of intelligence and a subjoined synchronizing pulse occuring with each repetitive selection; transmitting said pulse-produced carrier wave; receiving and demodulating the said transmitted wave; differentiating the concurrent articulations of the transmitted carrier wave; utilizing said demodulated wave to recreate the bands of intelligence by distributing the demodulated wave with recourse to the subjoined synchronizing signal and the differentiated concurrent articulations of the carrier wave; and synthesizing from the recreated bands of intelligence an audible sound substantially corresponding to the said original sound.

19. A method of communicating audible sounds comprising the steps of continuously analyzing the audible sounds to discriminate the characteristics thereof into bands of intelligence, transmitting alternating carrier currents having characteristics representative of the intelligence in said bands and being of opposite phase for successive intelligence bands, receiving and deriving from said carrier currents said intelligence band characteristics, channeling said derived intelligence band characteristics for the synthesizing therefrom of audible sound corresponding to said original sound, identifying successive intelligence bands by the opposite phases of said carrier, and controlling the channeling of said bands in accordance with the identification thereof.

20. In a communication system, a plurality of sources of signals to be transmitted in succession, a distributor adapted to pass from each of said sources in succession a pulse having a duration of a small fraction of the interval between said pulses, a band-pass filter connected to receive the pulses passed by said distributor, said filter having a transfer admittance such that said pulses excite said filter to produce oscillations having their phases reversed for successive pulses received, a transmission channel associated with said filter to transmit said oscillations, means for receiving and demodulating said oscillations, a plurality of signal destinations, a distributor adapted to pass pulses from said demodulating means to said signal destinations in succession, and means responsive to the reversed phase characteristics of said oscillations for controlling the second-mentioned distributor in relation to the pulse-passing frequency of the first-mentioned distributor.

21. In a signaling system, a transmission channel, a source of pulses having a duration of a small fraction of the interval between pulses, a band-pass filter connected between said source and said channel and having a transfer admittance characteristic such that said pulses excite said filter to produce oscillations having their phases reversed for successive pulses, oscillation receiving and demodulating means connected to respond to said oscillations, an oscillator, and means responsive to the reverse phase characteristics of said oscillations for controlling the frequency of said oscillator in relation to the frequency of said pulses.

22. In a signaling system, a source of pulses having a duration of a small fraction of the interval between pulses, a band-pass filter connected to said source and having a transfer admittance characteristic such that said pulses excite said filter to produce oscillations having their phases reversed for successive pulses, oscillation receiving and demodulating means connected to respond to said oscillations, an oscillator, and means responsive to the reversed phase characteristics of said oscillations for controlling the frequency of said oscillator in relation to the frequency of said pulses.

CARL A. DAHLBOM.
ALLAN WEAVER.

REFERENCES CITED

The following references are of record in the file of this patent:

UNITED STATES PATENTS

| Number | Name | Date |
| --- | --- | --- |
| 1,918,252 | Dunham | July 18, 1933 |
| 2,021,743 | Nicolson | Nov. 19, 1935 |
| 2,232,390 | Katzin | Feb. 18, 1941 |
| 2,443,198 | Sallach | Jan. 15, 1948 |
| 2,454,815 | Levy | Nov. 30, 1948 |
| 2,471,138 | Bartelink | May 24, 1949 |
| 2,471,333 | Leroy | May 24, 1949 |
| 2,486,391 | Cunningham | Nov. 1, 1949 |